(12) United States Patent
Ogura et al.

(10) Patent No.: US 12,137,505 B2
(45) Date of Patent: Nov. 5, 2024

(54) FLOODLIGHT CONTROL APPARATUS AND FLOODLIGHT CONTROL METHOD

(71) Applicants: SONY SEMICONDUCTOR SOLUTIONS CORPORATION, Kanagawa (JP); SONY GROUP CORPORATION, Tokyo (JP)

(72) Inventors: Yohei Ogura, Kanagawa (JP); Kensei Jo, Kanagawa (JP); Kenichiro Oi, Tokyo (JP); Takafumi Fujita, Kanagawa (JP)

(73) Assignees: SONY GROUP CORPORATION, Tokyo (JP); SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 538 days.

(21) Appl. No.: 17/289,103

(22) PCT Filed: Oct. 8, 2019

(86) PCT No.: PCT/JP2019/039651
§ 371 (c)(1),
(2) Date: Apr. 27, 2021

(87) PCT Pub. No.: WO2020/095603
PCT Pub. Date: May 14, 2020

(65) Prior Publication Data
US 2022/0007482 A1 Jan. 6, 2022

(30) Foreign Application Priority Data
Nov. 7, 2018 (JP) .................. 2018-209456

(51) Int. Cl.
*H05B 47/115* (2020.01)
*G01S 17/04* (2020.01)
*G01S 17/08* (2006.01)

(52) U.S. Cl.
CPC ............ *H05B 47/115* (2020.01); *G01S 17/04* (2020.01); *G01S 17/08* (2013.01)

(58) Field of Classification Search
None
See application file for complete search history.

(56) References Cited

U.S. PATENT DOCUMENTS 1,815,045 A * 7/1931 Boddie .................. G08C 17/02
315/362
4,768,020 A * 8/1988 Chen ...................... H05B 47/11
340/567

(Continued)

FOREIGN PATENT DOCUMENTS

| CA | 3052257 A | 8/2018 |
| CN | 104978011 A | 10/2015 |

(Continued)

OTHER PUBLICATIONS

International Search Report and Written Opinion of PCT Application No. PCT/JP2019/039651, issued on Dec. 24, 2019, 11 pages of ISRWO.

*Primary Examiner* — Srinivas Sathiraju
(74) *Attorney, Agent, or Firm* — CHIP LAW GROUP

(57) ABSTRACT

Provided is a floodlight control apparatus including a light receiving part which is provided with a plurality of light receiving elements which receives reflected light of light projected by a light projecting part, and an object detecting part which performs object detection targeted within a distance measurable range which is a range where the light receiving part is operable to receive the reflected light. The floodlight control apparatus further includes a control part which performs control of differentiating a light projection amount provided by the light projecting part in accordance with detection presence/absence of an object performed by the object detecting part and in a case where the object (Continued)

detecting part detects the object, differentiating a projection mode of the light projecting part between a detection region and a non-detection region of the object.

10 Claims, 21 Drawing Sheets

(56) References Cited

U.S. PATENT DOCUMENTS

| | | | |
|---|---|---|---|
| 7,499,638 B2 * | 3/2009 | Arai | G01S 17/86 |
| | | | 348/370 |
| 7,916,169 B2 * | 3/2011 | Omi | G06V 20/597 |
| | | | 348/78 |
| 8,761,594 B1 * | 6/2014 | Gross | G01S 7/4817 |
| | | | 396/155 |
| 9,237,634 B2 * | 1/2016 | Knibbe | G08B 29/181 |
| 11,871,497 B2 * | 1/2024 | Knauss | H05B 47/175 |
| 2004/0054454 A1 * | 3/2004 | Tsukaoka | B60S 1/0896 |
| | | | 701/49 |
| 2004/0124337 A1 | 7/2004 | Gondo | |
| 2004/0146203 A1 * | 7/2004 | Yoshimura | G06T 7/254 |
| | | | 382/218 |
| 2006/0072914 A1 * | 4/2006 | Arai | G01S 17/931 |
| | | | 396/324 |
| 2007/0222749 A1 * | 9/2007 | Baier | H03K 17/941 |
| | | | 345/157 |
| 2008/0237445 A1 * | 10/2008 | Ikeno | G01S 17/32 |
| | | | 250/205 |
| 2008/0303915 A1 * | 12/2008 | Omi | G06V 40/166 |
| | | | 348/222.1 |
| 2012/0181934 A1 * | 7/2012 | Knibbe | H05B 47/125 |
| | | | 315/153 |
| 2016/0178991 A1 * | 6/2016 | Wan | G03B 15/05 |
| | | | 362/11 |
| 2016/0259057 A1 * | 9/2016 | Ito | G03B 13/20 |
| 2017/0013183 A1 * | 1/2017 | Masuno | H04N 25/76 |
| 2017/0273161 A1 * | 9/2017 | Nakamura | G01S 7/484 |
| 2018/0189591 A1 * | 7/2018 | Ohki | G01S 17/89 |
| 2022/0007482 A1 * | 1/2022 | Ogura | G01S 17/08 |
| 2022/0354978 A1 * | 11/2022 | Candelore | A61L 2/24 |
| 2023/0204772 A1 * | 6/2023 | Higuchi | G01S 17/36 |
| | | | 356/5.01 |
| 2023/0243924 A1 * | 8/2023 | Takeyama | G01S 17/42 |
| | | | 356/4.01 |

FOREIGN PATENT DOCUMENTS

| | | | | |
|---|---|---|---|---|
| CN | 105723239 A | 6/2016 | | |
| CN | 106662640 A | 5/2017 | | |
| CN | 108281880 A | 7/2018 | | |
| CN | 110249105 A | 9/2019 | | |
| CN | 115843140 A * | 3/2023 | | |
| EP | 3223034 A1 | 9/2017 | | |
| EP | 3238430 A1 | 11/2017 | | |
| JP | 2002029344 A | 1/2002 | | |
| JP | 2003-109171 A | 4/2003 | | |
| JP | 2008-241435 A | 10/2008 | | |
| JP | 2009103626 A | 5/2009 | | |
| JP | 2011-133271 A | 7/2011 | | |
| JP | 2015-175712 A | 10/2015 | | |
| JP | 2017-173298 A | 9/2017 | | |
| JP | 2018004464 A | 1/2018 | | |
| JP | 2018-123653 A | 8/2018 | | |
| KR | 20140145482 A | 12/2014 | | |
| WO | WO-2011015975 A2 * | 2/2011 | | G08B 29/181 |
| WO | 2015/075926 A1 | 5/2015 | | |
| WO | 2015/137050 A1 | 9/2015 | | |
| WO | 2016/105668 A1 | 6/2016 | | |
| WO | 2018/143448 A1 | 8/2018 | | |

* cited by examiner

FLOODLIGHT CONTROL APPARATUS AND FLOODLIGHT CONTROL METHOD

CROSS REFERENCE TO RELATED APPLICATIONS

This application is a U.S. National Phase of International Patent Application No. PCT/JP2019/039651 filed on Oct. 8, 2019, which claims priority benefit of Japanese Patent Application No. JP 2018-209456 filed in the Japan Patent Office on Nov. 7, 2018. Each of the above-referenced applications is hereby incorporated herein by reference in its entirety.

TECHNICAL FIELD

The present technology relates to a floodlight control technology in an optical distance measurement system which acquires a distance image based on a light receiving signal obtained by receiving reflected light of projected light and, in particular, to a technology for performing floodlight control based on a result of detecting an object.

BACKGROUND ART

As a technology for conducting distance measurement of an object, distance measurement technology such as a structured light (STL) method and a time of flight (ToF) method has been known. An optical distance measurement system, to which such a distance measurement technology is applied, includes: a light projecting part, which projects light; and a light receiving part, which receives reflected light of the light projected by the light projecting part and is provided with a plurality of light receiving elements, and is configured to obtain a distance image (an image which represents a three-dimensional shape) of a target object based on a light receiving signal obtained by the light receiving part.

Regarding the above-mentioned optical distance measurement system, disclosed in Patent Document 1 is a technology which controls a light projection amount provided by a light projecting part in accordance with presence/absence of an object (target object) within a field of view, which is targeted for distance measurement. Specifically, disclosed in the above-mentioned Patent Document 1 is the technology which controls the light projection amount in such a way that in a case where the target object is present, the light projection amount of the light projecting part is set to be a first light amount and in a case where the target object is not present, the light projection amount of the light projecting part is set to be a second light amount which is smaller than the first light amount.

CITATION LIST

Patent Document

Patent Document 1: Japanese Patent Application Laid-Open No. 2015-175712

SUMMARY OF THE INVENTION

Problems to be Solved by the Invention

Here, the optical distance measurement system to which the above-mentioned ToF method or the like is applied can also be mounted in a mobile apparatus such as a smartphone and a tablet terminal, and it is desired that power consumption is made low.

In view of the above-mentioned circumstances, the present technology was devised, and it is an object to make the power consumption low by making the power consumption required for light projection efficient for the optical distance measurement system.

Solutions to Problems

A floodlight control apparatus according to the present technology includes: a light receiving part which is provided with a plurality of light receiving elements which receives reflected light of light projected by a light projecting part; an object detecting part which performs object detection targeted within a distance measurable range which is a range where the light receiving part is operable to receive the reflected light; and a control part which performs control of differentiating a light projection amount provided by the light projecting part in accordance with detection presence/absence of an object performed by the object detecting part and in a case where the object detecting part detects the object, differentiating a projection mode of the light projecting part between a detection region and a non-detection region of the object.

As described above, by differentiating the light projection amount in accordance with the detection presence/absence of the object, when the object as the target for the distance measurement is not detected, it is made possible to decrease the light projection amount, thereby devising prevention of unnecessary power consumption. In addition, by differentiating the projection mode between the non-detection region and the detection region in the case where the object is detected, it is made possible to make the light projection amount (including also a light projection amount per unit time) in the non-detection region smaller than that in the detection region, thereby allowing power consumed while the distance measurement of the detected object is performed to be reduced.

In the floodlight control apparatus according to the above-described present technology, it is desirable that the control part performs control in which in an object detection state, a light projection frequency for the non-detection region is made lower than a light projection frequency for the detection region.

With this arrangement, it is made possible to reduce the power consumed in the object non-detection state and also the power consumed while the distance measurement of the detected object is performed. In addition, since it is made possible to perform the distance measurement based on the light receiving signal obtained by the light receiving part as to the non-detection region, an object which newly appears within the distance measurable range can be detected without separately providing an imaging part for the object detection.

In the floodlight control apparatus according to the above-described present technology, it is desirable that the control part performs control in which in the object detection state, light projection power for the non-detection region is made lower than light projection power for the detection region.

With this arrangement, it is made possible to reduce the power consumed in the object non-detection state and also the power consumed while the distance measurement of the detected object is performed. In addition, since the distance measurement can be performed based on the reflected light of the light having the low power and projected for the non-detection region, the detection of an object which newly appears within the distance measurable range can be performed without separately providing the imaging part for the object detection.

In the floodlight control apparatus according to the above-described present technology, it is desirable that in the object detection state, the control part controls the light projecting part not to project the light for the non-detection region.

With this arrangement, the power consumed while the distance measurement of the detected object is performed can be minimized.

In the floodlight control apparatus according to the above-described present technology, it is desirable that in an object non-detection state, the control part controls the light projecting part to project the light in a light projection amount smaller than a light projection amount of the light projected for the detection region in the object detection state.

With this arrangement, in the object non-detection state, the reduction in the consumed power by lowering the light projection amount can be devised and based on the distance image obtained based on the reflected light of the projected light, the object detection can be performed. In other words, it is not required to separately provide the imaging part for the object detection to enable the object detection in the object non-detection state.

In the floodlight control apparatus according to the above-described present technology, it is desirable that the control part changes a range of light projection performed by the light projecting part in accordance with movement of the object.

With this arrangement, in a case where the object moves, it can be prevented that the light is not projected to a part of the object and the distance measurement is made impossible.

In the floodlight control apparatus according to the above-described present technology, it is desirable that the control part differentiates a projection mode of the light projecting part between a detection region and a non-detection region of a dynamic object detected by the object detecting part.

With this arrangement, the light projection amount for a static object can be lowered with respect to that in a case where a target for the distance measurement is a dynamic object.

In the floodlight control apparatus according to the above-described present technology, it is desirable that the light receiving part is configured to be operable to switch between a first light receiving mode which is a light receiving mode for distance measurement and a second light receiving mode which is a light receiving mode for infrared light image acquisition, and in the object non-detection state, the control part causes the light receiving part to operate in the second light receiving mode.

With this arrangement, the light projection is unnecessary to perform the object detection in the object non-detection state. In addition, it is not required to separately provide the imaging part for the object detection to enable the object detection in a state in which the light projection is not performed.

In the floodlight control apparatus according to the above-described present technology, it is desirable that an unnecessary region setting part which sets a distance measurement unnecessary region within the distance measurable range is further included, and regardless of the detection presence/absence of the object performed by the object detecting part, the control part controls the light projecting part not to project the light for the distance measurement unnecessary region.

With this arrangement, the light is not projected for the region in which the distance measurement is unnecessary.

In the floodlight control apparatus according to the above-described present technology, it is desirable that the unnecessary region setting part sets the distance measurement unnecessary region based on a light receiving signal obtained by the light receiving part.

By using the light receiving signal, the region whose distance measurement is estimated to be unnecessary such as a region where a physical object is present at a distance at which the light does not reach the physical object (that is, a distance substantially unmeasurable region) can be detected, and the distance measurement unnecessary region can be set, not by hand.

In the floodlight control apparatus according to the above-described present technology, it is desirable that the light receiving part is configured to be operable to receive reflected light of light which a plurality of the light projecting parts projects for respective different regions within the distance measurable range.

By using the plurality of light projecting parts, it is made possible to cause the individual light projecting parts to share the whole wide-angle distance measurable range as the light projection range.

In addition, a floodlight control method according to the present technology includes: an object detection procedure in which performed is object detection targeted within a distance measurable range which is a range where a light receiving part being provided with a plurality of light receiving elements which receives reflected light of light being projected by a light projecting part is operable to receive the reflected light; and a control procedure in which performed is control of differentiating a light projection amount being provided by the light projecting part in accordance with detection presence/absence of an object being performed in the object detection procedure and in a case where the object is detected in the object detection procedure, differentiating a projection mode of the light projecting part between a detection region and a non-detection region of the object.

Also by employing the floodlight control method as the above-described embodiment, action similar to that obtained by the floodlight control apparatus as each of the above-described embodiments can be obtained.

MODE FOR CARRYING OUT THE INVENTION

Hereinafter, with reference to the accompanying drawings, embodiments according to the present technology will be described in the following order.
<1. First Embodiment>
[1-1. Configuration of Floodlight control apparatus]
[1-2. Floodlight Control Method as First Embodiment]
[1-3. Processing Procedure]
[1-4. Detection of Dynamic Object]
<2. Second Embodiment>
<3. Third Embodiment>
<4. Fourth Embodiment>
<5. Modified Examples of Each Embodiment>
<6. Concluding Remarks of Embodiments>
<7. The Present Technology>

1. FIRST EMBODIMENT 1-1. Configuration of Floodlight Control Apparatus

Figure 1:
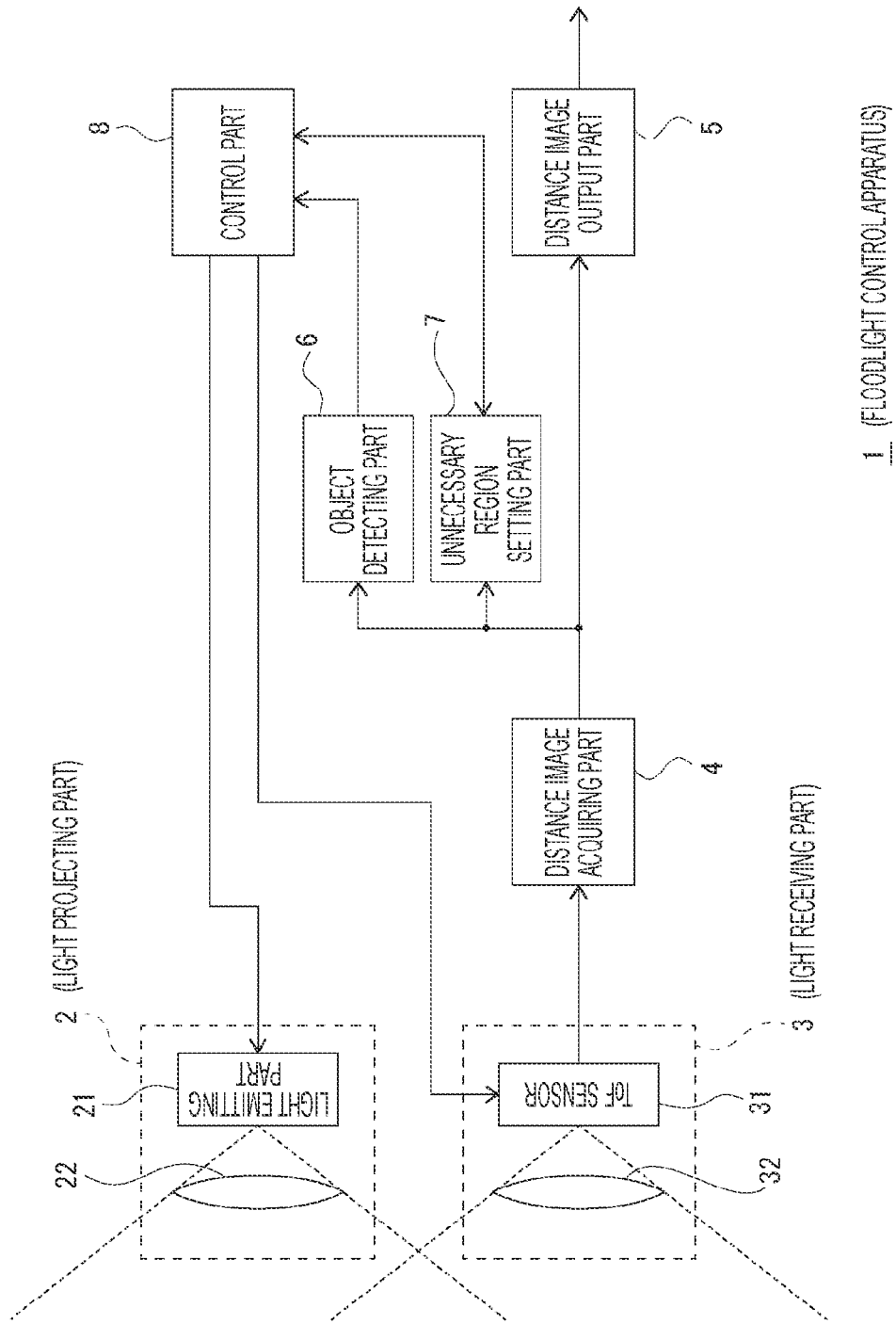
FIG. 1 is a diagram illustrating a configuration example of a floodlight control apparatus as a first embodiment according to the present technology.

FIG. 1 illustrates a configuration example of a floodlight control apparatus 1 as one embodiment of a floodlight control apparatus according to the present technology.

As shown in FIG. 1, the floodlight control apparatus 1 includes a light projecting part 2, a light receiving part 3, a distance image acquiring part 4, a distance image output part 5, an object detecting part 6, an unnecessary region detecting part 7, and a control part 8.

The light projecting part 2 has a light emitting part 21 and a light projecting optical system 22 and projects light emitted by the light emitting part 21 via the light projecting optical system 22. In the present embodiment, the light emitting part 21 is constituted of a plurality of light sources and has a vertical cavity surface emitting laser (VCSEL) type light emitting elements as the light sources, and these light emitting elements are arrayed, for example, in a predetermined state such as a matrix state. The VCSEL type light emitting elements are laser light emitting elements whose resonator is formed in a direction perpendicular to a substrate surface of a semiconductor and which are configured to emit laser light in a vertical direction.

The light receiving part 3 receives reflected light of the light projected by the light projecting part 2, that is, reflected light from a target object (a target object of distance measurement). The light receiving part 3 has a time of flight (ToF) sensor 31 which is provided with a plurality of light receiving elements which receives the above-mentioned reflected light and a light receiving optical system 32, and the above-mentioned reflected light is received via the light receiving optical system 32 by the light receiving elements of the ToF sensor 31.

In the present embodiment, the light projecting part 2 is configured to project infrared light by having light emitting elements which emit infrared light, as the light emitting elements of the light emitting part 21, and the ToF sensor 31 of the light receiving part 3 is also configured to be operable to receive the infrared light.

In the present embodiment, for the ToF sensor 31, a configuration which employs an indirect ToF (iToF) method as a ToF distance measurement method is adopted.

Here, information pertinent to distance distribution in a region targeted for the distance measurement can be acquired by a system which detects the reflected light (including scattered light) of the light projected to the target object. By measuring times from when the light sources emit light pulses to when the light receiving elements (that is, light detecting cells) of the ToF sensor receive the light pulses, that is, by measuring the times of flight, each piece of distance information of each of the light receiving elements (that is, each pixel) can be acquired. Such a distance measurement method is called a direct ToF (dToF) method.

On the other hand, by appropriately controlling timing of accumulation (which can be referred to as "exposure" in other words) of signal electric charge of a plurality of light detecting cells of the ToF sensor in synchronization with emission of the light pulses, a signal cumulative amount in the light detecting cells can be changed in accordance with a distance to the target object. Such control allows distance distribution to be obtained based on the signal cumulative amount of the light detecting cells. Such a distance measurement method is called the indirect ToF method.

In the indirect ToF method, under a presupposition that as to the distance image, image acquisition is performed at, for example, a frame rate of approximately several tens of hertz (Hz), the light projecting part 2 continuously projects the light pulses at a period which is sufficiently faster than the above-mentioned frame rate (for example, a period of approximately several tens of MHz to several hundreds of MHz). The above-mentioned continuous light projection of the light pulses is continuously performed over a predetermined time period within one frame period.

The ToF sensor 31 intermittently performs the signal electric charge accumulation of the light receiving signal at a period in synchronization with a period of the light pulses and obtains each electric charge accumulation value (electric charge integrated value) of each different phase (for example, each of phases of zero degree, 90 degrees, 180 degrees, and 270 degrees) of the light pulses. With this arrangement, for each one frame period, each of the electric charge integrated values of each different phase of the light pulses can be obtained for each of the light receiving elements.

As is well known, in the indirect ToF method, each electric charge integrated value of each phase obtained for each of the light receiving elements is calculated in a predetermined manner and distance information of each pixel can be obtained.

The distance image acquiring part 4 obtains the distance image based on the light receiving signal obtained by the light receiving part 3. In other words, in the present embodiment, by employing the above-mentioned indirect ToF method, based on the light receiving signal of the light receiving elements in the light receiving part 3, a distance image which represents distance information of each pixel is acquired.

The distance image output part 5 outputs the distance image acquired by the distance image acquiring part 4 to, for example, a signal processing apparatus, such as a computer apparatus not shown, which performs a variety of processes using the distance image (for example, analysis processing of an object).

The object detecting part 6 inputs the distance image acquired by the distance image acquiring part 4 thereto and performs object detection made within a distance measurable range Fv, as a detection target range, which is a range in which the light receiving part 3 can receive the reflected light (reflected light of the light projected by the light projecting part 2). Specifically, the object detecting part 6 in the present embodiment performs the object detection made within the distance measurable range Fv as detection target range based on the distance image acquired by the distance image acquiring part 4. In the present embodiment, object detection is conducted by employing a background differencing technique. As is well known, in the background differencing technique, by comparing an observed image and a previously acquired image, a physical object which is not present in the previously acquired image is extracted.

The object detecting part 6 in the present embodiment sets an image region, which includes a detected object within the distance image, as a region of interest (ROI). In the present embodiment, information which represents an object detection result obtained by the object detecting part 6, that is, information which represents presence/absence and a position (a position within the distance image) of the ROI is supplied to the control part 8.

The unnecessary region setting part 7 sets a distance measurement unnecessary region An within the distance measurable range Fv.

The unnecessary region setting part 7 in the present embodiment sets the distance measurement unnecessary region An based on the distance image acquired by the distance image acquiring part 4. In other words, based on a distance measurement result based on the light receiving signal obtained by the light receiving part 3, the distance measurement unnecessary region An is set. Information of the distance measurement unnecessary region An set by the unnecessary region setting part 7 is supplied to the control part 8.

Note that details of the distance measurement unnecessary region An will be described later.

The control part 8 is constituted of, for example, a microcomputer which has a central processing unit (CPU), a read only memory (ROM), a random access memory (RAM), and the like or an information processing apparatus such as a digital signal processor (DSP) and controls operation of the light projecting part 2 and operation of the light receiving part 3.

In particular, as to the operation of the light projecting part 2, in accordance with presence/absence of detection of an object performed by the object detecting part 6, control in which a light projection amount projected by the light projecting part 2 is differentiated is performed. In addition, control in which in a case where the object detecting part 6 detects the object, a projection mode of the light projecting part 2 is differentiated between a detection region and a non-detection region of the object is performed.

1-2. Floodlight Control Method as First Embodiment

Hereinafter, with reference to FIGS. 2A, 2B, 2C, 2D, 3, 4, 5, 6, 7, 8, and 9, a floodlight control method, which is realized by the control part 8, as a first embodiment will be described.

First, with reference to FIGS. 2A, 2B, 2C, and 2D, standby modes and a normal mode as modes related to the projection made by the light projecting part 2 will be described.

Figure 2:
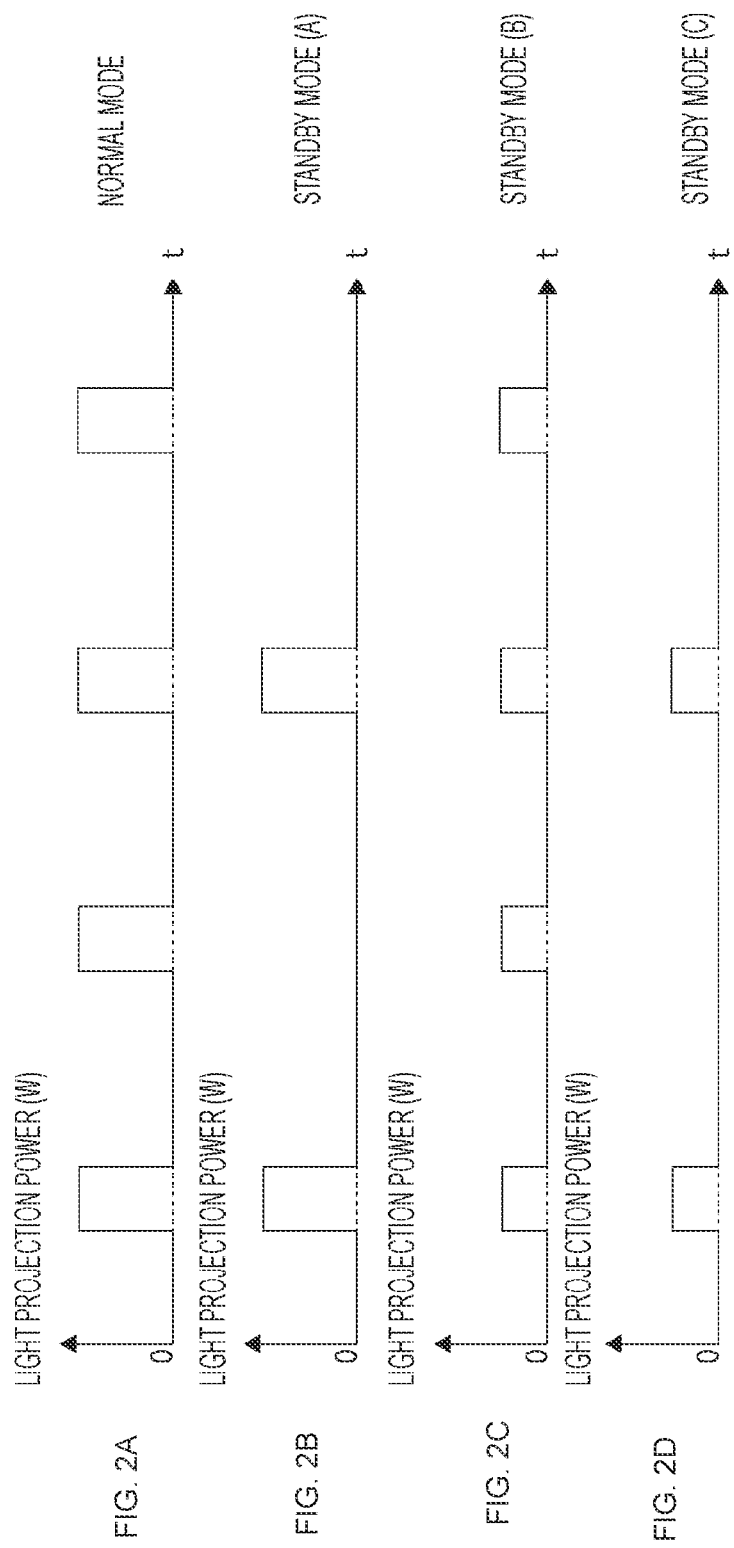
FIGS. 2A, 2B, 2C, and 2D are explanatory diagrams of a standby mode and a normal mode in the embodiment.

First, in the normal mode shown in FIG. 2A, it is supposed that power of the light projected by the light projecting part 2 ("LIGHT PROJECTION POWER" in FIG. 2A) and a period (frequency) of the light projection are defined as shown in FIG. 2A. Here, a period of the light projection in the normal mode is a period which corresponds to a normal frame rate of the ToF sensor 31. The normal frame rate here is, for example, 60 fps (frames per second).

Here, each ON time period of the light projection power shown in FIG. 2A indicates a time period during which the light projecting part 2 performs the light projection for the distance measurement, and in a case where the indirect ToF method is adopted as in the present embodiment, continuous light projection of light pulses is performed within this ON time period (in other words, periodic light projection at a frequency of the above-mentioned approximately several tens of MHz to several hundreds of MHz is performed).

In the normal mode shown in FIG. 2A, at a normal frame rate, the ON time period of the light projection power appears once per frame. In the indirect ToF method, after this ON time period of the light projection power, the distance information of each of the light receiving elements (each pixel) based on the above-described each of the electric charge integrated values is computed and each distance information of each pixel in each frame is acquired.

FIGS. 2B, 2C, and 2D are explanatory diagrams of a standby mode (A), a standby mode (B), and a standby mode (C), respectively.

As shown in FIGS. 2A, 2B, 2O, and 2D, in the standby mode (A), an ON period of the light projection power is made longer than that in the normal mode, and in other words, the standby mode (A) is a mode in which while a frequency at which the light projection is made by the light projecting part 2 is smaller than that in the normal mode, light projection power in each ON time period is made the same as that in the normal mode.

The standby mode (B) is a mode in which while an ON period of light projection power is the same as that in the normal mode, the light projection power in each ON time period is made lower than that in the normal mode.

The standby mode (C) is a mode in which while each ON period of the light projection power is made longer than that in the normal mode, the light projection power in each ON time period is made lower than that in the normal mode, and it can be said that the standby mode (C) is a mode in which the standby mode (A) and the standby mode (B) are mixed.

Note that although in FIGS. 2A, 2B, 2C, and 2D, as to the standby mode (A) and the standby mode (C), an example in which the ON period of the light projection power in the standby mode is a period double the period in the normal mode is shown, it is only required for the ON period in each of the standby modes to be longer than that in the normal mode.

In accordance with the detection presence/absence of the object performed by the object detecting part 6, the control part 8 differentiates the projection mode of the light projecting part 2 between the normal mode and the standby modes. Specifically, in an object non-detection state, the control part 8 controls the light projecting part 2 to perform the light projection in any projection mode of the standby modes (A), (B), and (C). By performing the light projection in any projection mode of the standby modes (A), (B), and (C), in the object non-detection state, the light receiving part 3 can receive the reflected light of the light projected for the distance measurement during the ON time period of the light projection power, and the object detecting part 6 can perform the object detection based on the distance image.

Here, in any of the standby modes (A), (B), and (C), in principle, a range in which the light projection is performed is the whole range within the distance measurable range Fv. However, in a case where a distance measurement unnecessary region An is set, the present embodiment is not limited thereto (details thereof will be described later).

In a case where the object detecting part 6 detects the object during any of the standby modes, the control part 8 controls the light projecting part 2 to perform the light projection in the normal mode.

Here, although as to the light projection in a case where the object as a target for the distance measurement is detected, the light projection in the normal mode can be performed with the whole range within the distance measurable range Fv as a target. In order to devise further low power consumption in conjunction with low power consumption in any of the standby modes in the above-mentioned object non-detection state, in the present embodiment, as to the light projection in an object detection state, the projection mode is differentiated between a detection region and a non-detection region of the object.

Specifically, in the present embodiment, in the object detection state, the light projection in the normal mode is performed in the detection region of the object, and in the non-detection region of the object, light projection in a projection mode in which a light projection amount is made smaller than that in the normal mode is performed.

In the present embodiment, the object detection region is the above-mentioned ROI, and accordingly, as mentioned above, control in which a light projection amount for the object detection region is relatively increased, as compared with that for the non-detection region, can be called control which lays emphasis on the light projection of the ROI in other words, and in this meaning, hereinafter, such control is referred to as "ROI emphasis floodlight control".

Figure 3:
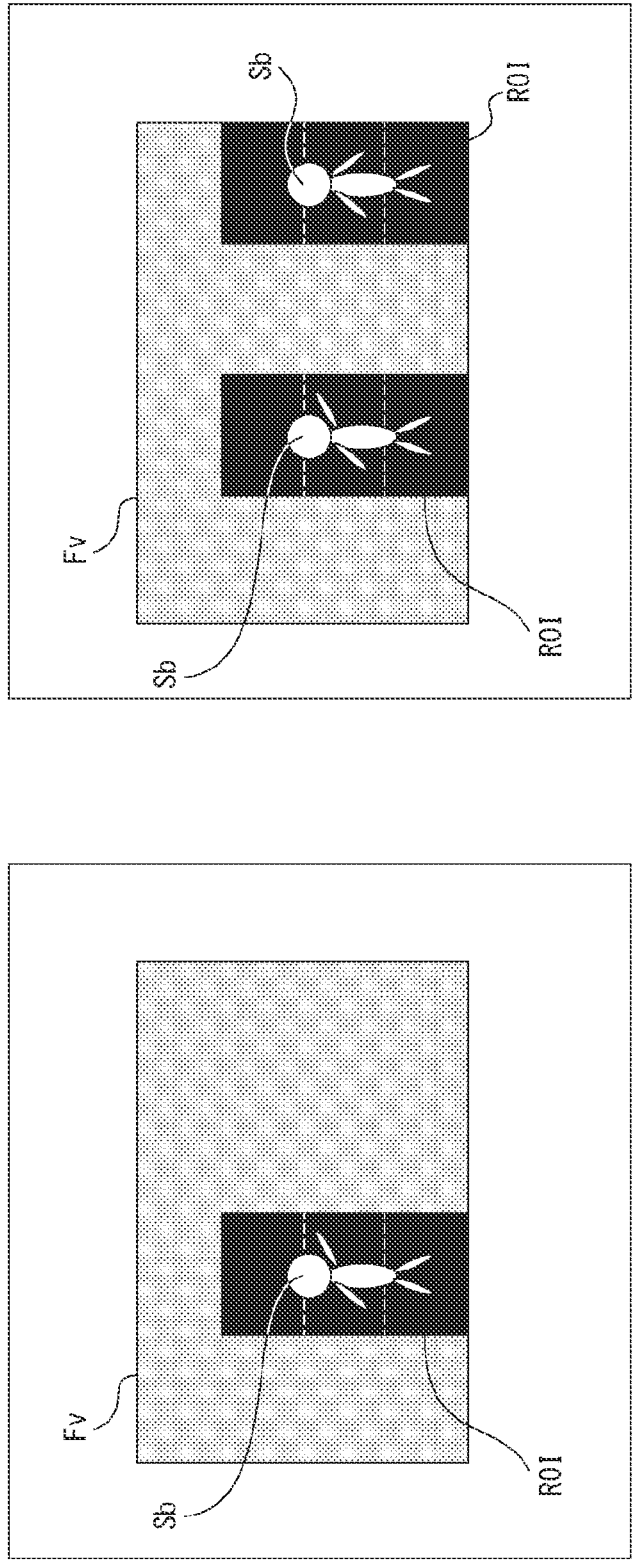
FIG. 3 is an explanatory diagram as to a first example of a ROI emphasis floodlight control.

FIG. 3 is an explanatory diagram as to a first example of the ROI emphasis floodlight control.

Note that in the following description, an object targeted for the distance measurement is referred to an "object Sb".

In the first example, the light projection in the normal mode is performed for the ROI as the detection region of the object Sb, and light projection in a projection mode similar to the standby mode (B) (the mode in which the ON period of light projection power is the same as that in the normal mode, and the light projection power is made lower than that in the normal mode) is performed for a region other than the ROI, that is, the non-detection region of the object Sb. As shown in FIG. 3, in a case where a plurality of objects Sb is detected, the plurality of ROIs is set, and in this case, the light projection in the normal mode is performed for each of the ROIs.

As described above, in the object detection state, by performing the light projection for the object non-detection region, in a case where an object has newly appeared within the distance measurable range Fv, the object detecting part 6 can detect the new object based on a distance image (distance measurement result).

In the first example, since the light projection period for the object non-detection region is the same as the light projection period for the object detection region (that is, a normal frame rate), a detection delay of the objects Sb can be prevented.

Figure 4:
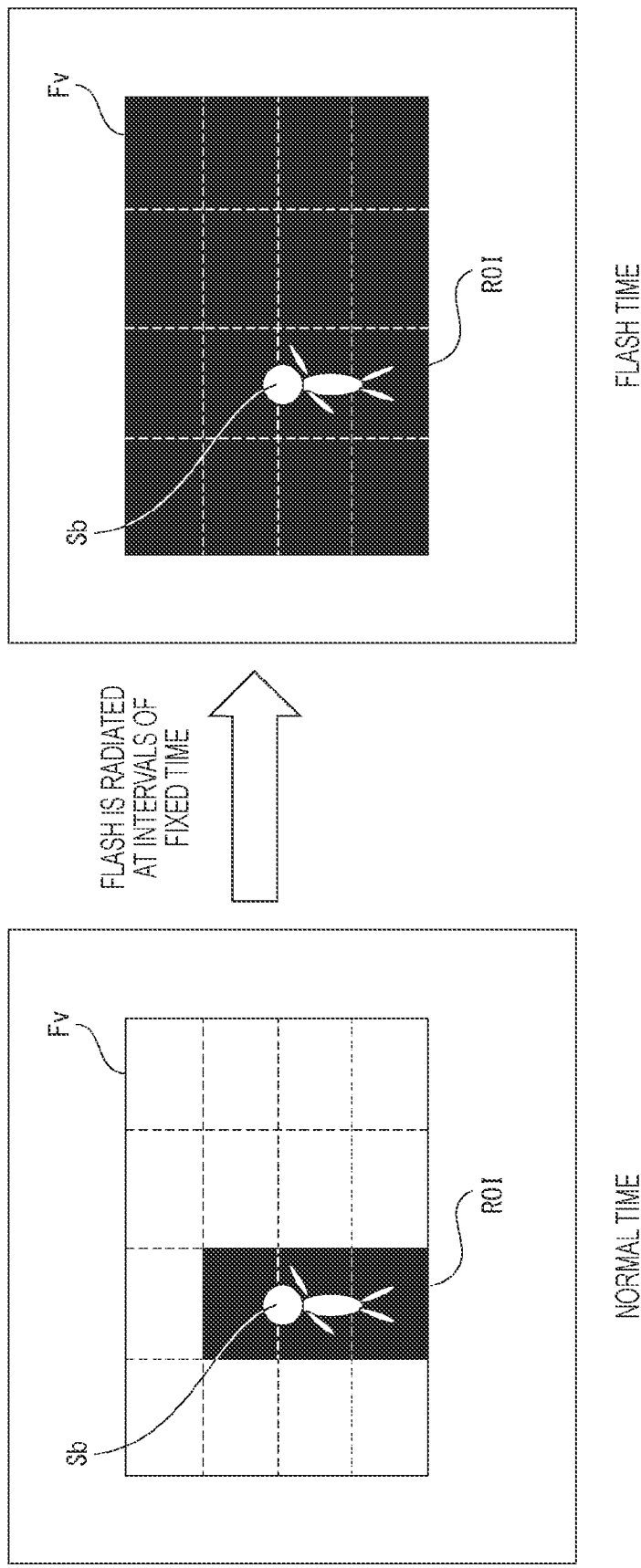
FIG. 4 is an explanatory diagram as to a second example of the ROI emphasis floodlight control.

FIG. 4 is an explanatory diagram as to a second example of the ROI emphasis floodlight control.

In the second example, the light projection in the normal mode is performed for the detection region (ROI) of the object Sb in a manner similar to the manner in the first example, and a flash is radiated at intervals of a fixed time for the non-detection region of the object Sb.

Figure 5:
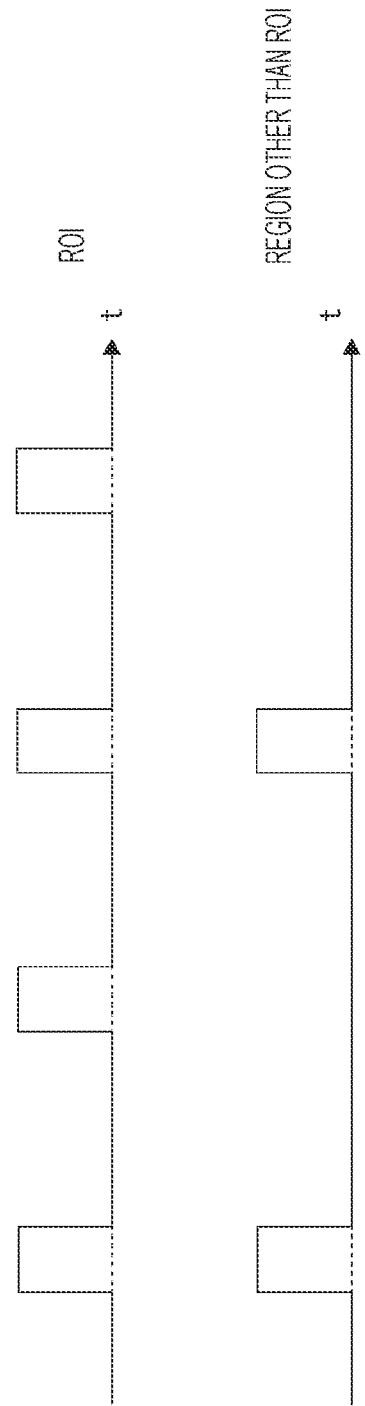
FIG. 5 shows a light projection power ON time period and light projection power as to each of a ROI and a region other than the ROI in a comparative manner in the second example.

FIG. 5 shows a light projection power ON time period and light projection power as to each of the ROI and a region other than the ROI in a comparative manner in the second example, and in the second example, as to the region other than the ROI, as in the above-described standby mode (A), light projection in a projection mode in which a repetitive period of the light projection power ON time period is made longer than that in the normal mode is performed.

In the second example, since the light projection power for the object non-detection region is the same as the light projection power (that is, power for normal distance measurement) for the object detection region, an accuracy of a value of a distance used for the detection of the object Sb is enhanced, and a detection accuracy of the object Sb is enhanced.

Figure 6:
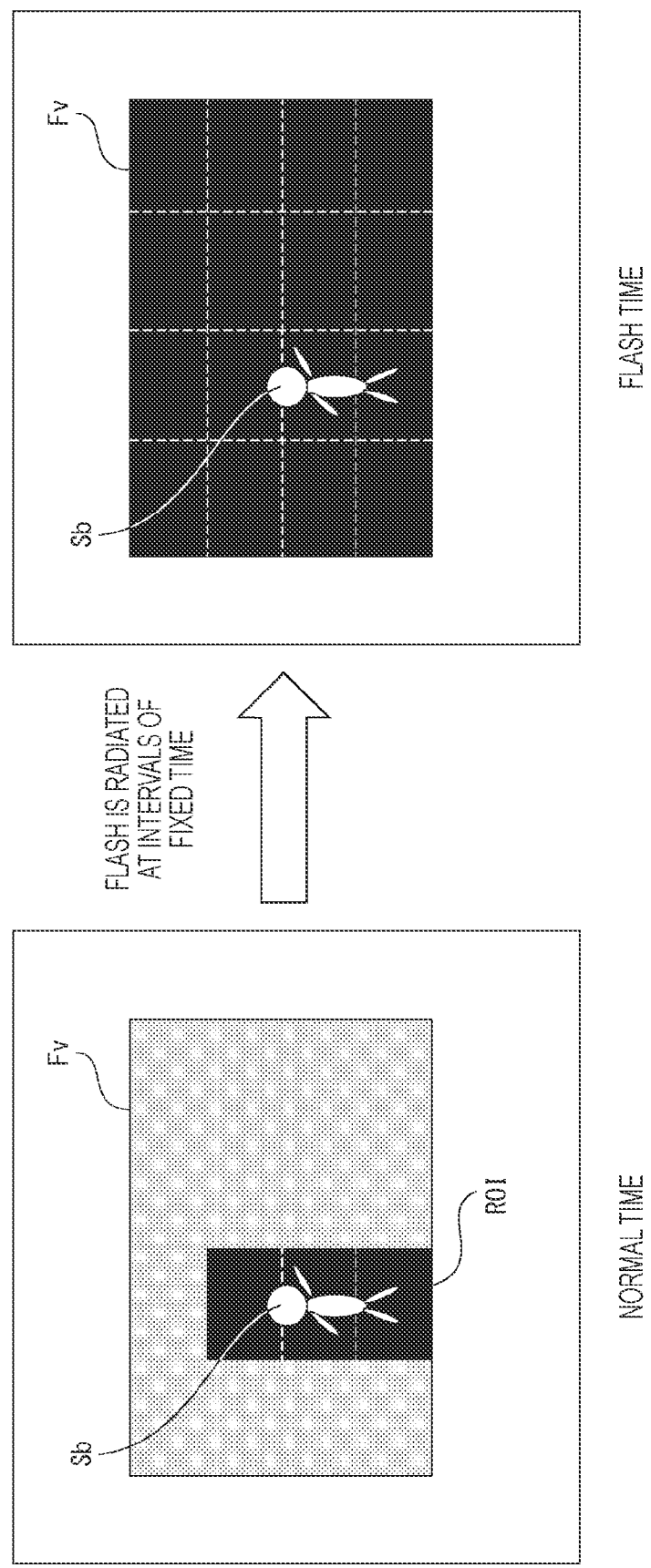
FIG. 6 is an explanatory diagram as to a third example of the ROI emphasis floodlight control.

FIG. 6 is an explanatory diagram as to a third example of the ROI emphasis floodlight control.

In the third example, in a manner similar to the manner in the second example, the flash is radiated at intervals of a fixed time for the non-detection region of the object Sb by light projection power similar to that in the normal mode, and between the flashes, each light projection time period by power lower than that in the normal mode is inserted.

Figure 7:
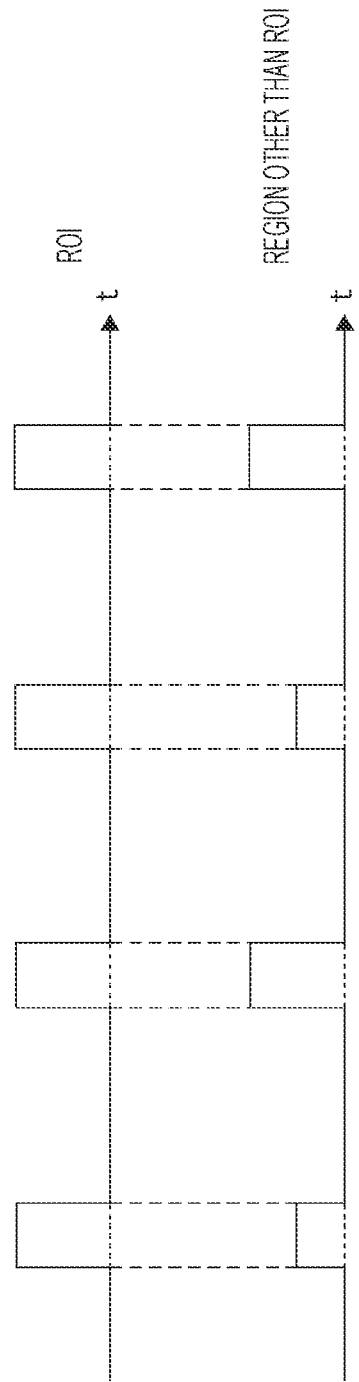
FIG. 7 shows a light projection power ON time period and light projection power as to each of a ROI and a region other than the ROI in a comparative manner in the third example.

FIG. 7 shows a light projection power ON time period and light projection power as to each of the ROI and the region other than the ROI in a comparative manner in the third example, and as described above, in the third example, although as to the region other than the ROI, a repetitive period of a light projection power ON time period is equivalent to that as to the ROI (that is, equivalent to that in the normal mode), a time period in which the light projection power is the same as that in the normal mode and a time period in which the light projection power is lower than that in the normal mode are alternately repeated.

According to the third example, since as to the object non-detection region, a section in which the light projection power is made lower than that in the normal mode is inserted, as compared with a case where the light projection in the normal mode is performed without distinguishing the detection region and the non-detection region of the object Sb, low power consumption can be devised.

In addition, according to the third example, since the period of the object detection based on the distance measurement result can be the same as the period of the normal frame rate, a detection delay of the objects Sb can be prevented. In addition, in the time period in which the flash is radiated, a detection accuracy of the object Sb can be enhanced.

Here, the object Sb may be a moving object (dynamic object) such as a person, and in such a case, in accordance with movement of the object Sb, a range of the light projection performed by the light projecting part 2 is changed. Specifically, a range in which the emphasis light projection is performed is changed.

Figure 8:
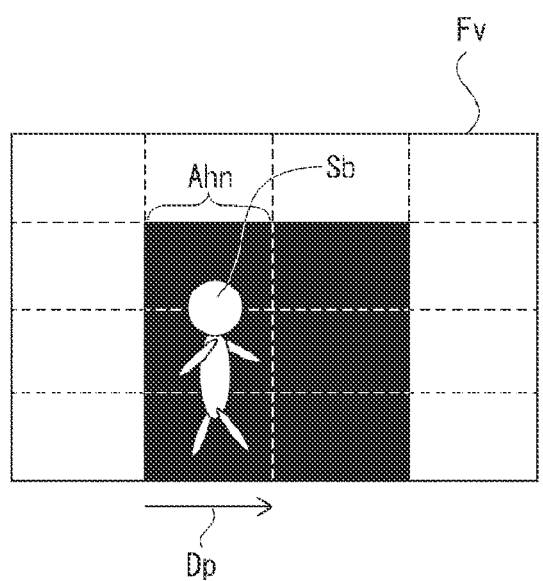
FIG. 8 is an explanatory diagram as to a follow-up function of an emphasis projection range.

FIG. 8 is an explanatory diagram as to a follow-up function of an emphasis projection range. In FIG. 8, each one region in the distance measurable range Fv which is sectioned by vertical and horizontal dotted lines in a matrix manner schematically shows a minimum change unit of the light projection range and hereinafter, is referred to as a "block". In the floodlight control apparatus 1 of the present embodiment, it is made impossible to differentiate the projection mode in a unit smaller than this block.

Based on an object detection result performed by the object detecting part 6 (information indicating the ROI in the present embodiment, and hereinafter, referred to as ROI information), the control part 8 detects a traveling direction Dp of the object Sb. Based on the ROI information which is acquired at a plurality of times on a time axis (in particular, information indicating a position of the ROI), this traveling direction Dp can be detected.

Additionally, the control part 8 determines whether or not an end side position on a side of the traveling direction Dp of the ROI has come in proximity to another end side position on the side of the traveling direction Dp of the emphasis projection range indicated by "Ahn" in FIG. 8, that is, an emphasis projection range at the current time point, (that is, a light projection range in the normal mode in the present embodiment and hereinafter, referred to as a current emphasis projection range Ahn) (for example, a distance between both end side positions becomes within a predetermined distance), and in a case where a positive result is obtained, the control part 8 sets, as a new emphasis projection range, a range in which blocks neighboring the side of the traveling direction Dp of the current emphasis projection range Ahn are added to the current emphasis projection range Ahn. Furthermore, as to the newly set emphasis projection range (a new current emphasis projection range Ahn), similarly, the control part 8 determines whether or not an end side position on the side of the traveling direction Dp of the ROI has come in proximity to another end side position on the side of the traveling direction Dp of the current emphasis projection range Ahn, and when a positive result is obtained, the control part 8 sets, as a new emphasis projection range, a range in which blocks neighboring the side of the traveling direction Dp of the current emphasis projection range Ahn are added to the current emphasis projection range Ahn in a repeated manner. During this, the control part 8 determines whether or not an end side position on a side opposite to the side of the traveling direction Dp of the ROI has exceeded another end side position on the side of the traveling direction Dp of a block of the blocks constituting the current emphasis projection range Ahn, the block located in an end portion on the side opposite to the side of the traveling direction Dp (hereinafter, referred to as an opposite direction end block), and in a case where a positive result is obtained, the control part 8 sets, as a new emphasis projection range, a range in which the opposite direction end block is excluded from the current emphasis projection range Ahn.

With this arrangement, while the follow-up of the range in which the emphasis light projection is performed is conducted in accordance with the movement of the object Sb, it can be prevented that the emphasis light projection is continuously performed for all of the blocks where the object Sb has been located in the past. In other words, it is made possible to enable both of preventing of disabling of distance measurement for a part of the distance measurement target (that is, preventing of distance measurement omission as to the distance measurement target) made by the follow-up of the emphasis projection range and the low power consumption.

Here, in the floodlight control apparatus 1 of the present embodiment, in the distance measurable range Fv, for example, as to a region or the like where the light does not substantially arrive and the distance measurement unnecessary region An where the distance measurement is unnecessary, no light projection is performed, regardless of the detection presence/absence of the object Sb performed by the object detection 6.

Figure 9:
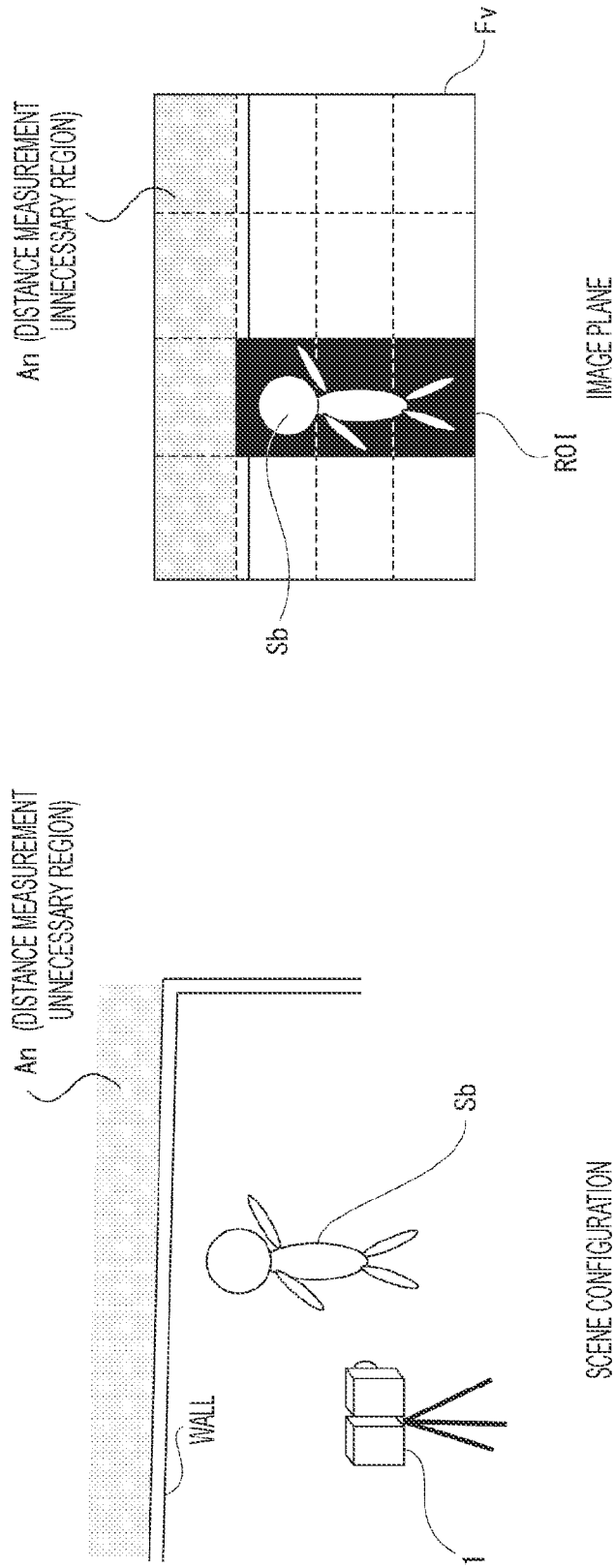
FIG. 9 is an explanatory diagram as to a distance measurement unnecessary region in the embodiment.

FIG. 9 is an explanatory diagram as to the distance measurement unnecessary region An, and on a left side in FIG. 9, a scene configuration in which the distance measurement is performed is schematically shown and on a right side in FIG. 9, an image plane of a distance image obtained in the scene configuration is schematically shown.

In the present embodiment, the distance measurement unnecessary region An means, for example, a region where the distance measurement is substantially disabled, such as a region such as sky which is included within the distance measurable range Fv and is at a long distance and a region where a physical object whose reflectance is extremely low is present.

In the present embodiment, the unnecessary region setting part 7 sets the distance measurement unnecessary region An based on a distance image. Specifically, within the distance image, for example, reliability of information of a distance acquired for each predetermined image region of each pixel or the like is evaluated, and an image region whose reliability is low is set as the distance measurement unnecessary region An.

For example, as to a region where a physical object is present at a long distance at which the projected light does not arrive and a region where a physical object whose reflectance is extremely low is present, an evaluation value as to the reliability of the distance information is low. Therefore, by detecting a region whose evaluation value is lowered to be a predetermined value or less, setting the distance measurement unnecessary region An is enabled.

Note that based on a magnitude of a light receiving signal value (in the present embodiment, the above-described electric charge integrated value) of the light receiving part 3, the distance measurement unnecessary region An can also be set. In other words, the distance measurement unnecessary region An can be set based on at least the light receiving signal of the light receiving part 3.

Here, it is considered that the distance measurement unnecessary region An set by the unnecessary region setting part 7 is executed, for example, as calibration made when the floodlight control apparatus 1 is installed where the distance measurement should be performed. In addition, in order to adaptably set the distance measurement unnecessary region An in a case where a distance measurement target can change over time or other case, the distance measurement unnecessary region An may be set at a plurality of times on a time axis at intervals of a constant time period or irregular intervals, such as repeatedly setting of the distance measurement unnecessary region An at intervals of a predetermined time.

By not performing the light projection to the distance measurement unnecessary region An, within the distance measurable range Fv, the light projection to the region where the distance measurement is unnecessary, such as the region where the distance measurement is substantially disabled, is not performed, thereby making power consumption required for the light projection further efficient.

Here, in this floodlight control method as the above-described embodiment, it is made possible to reduce the light projection amount required for the distance measurement, and this is advantageous in attaining a wide view angle (wide field angle) of the distance measurable range Fv.

Figure 10A:
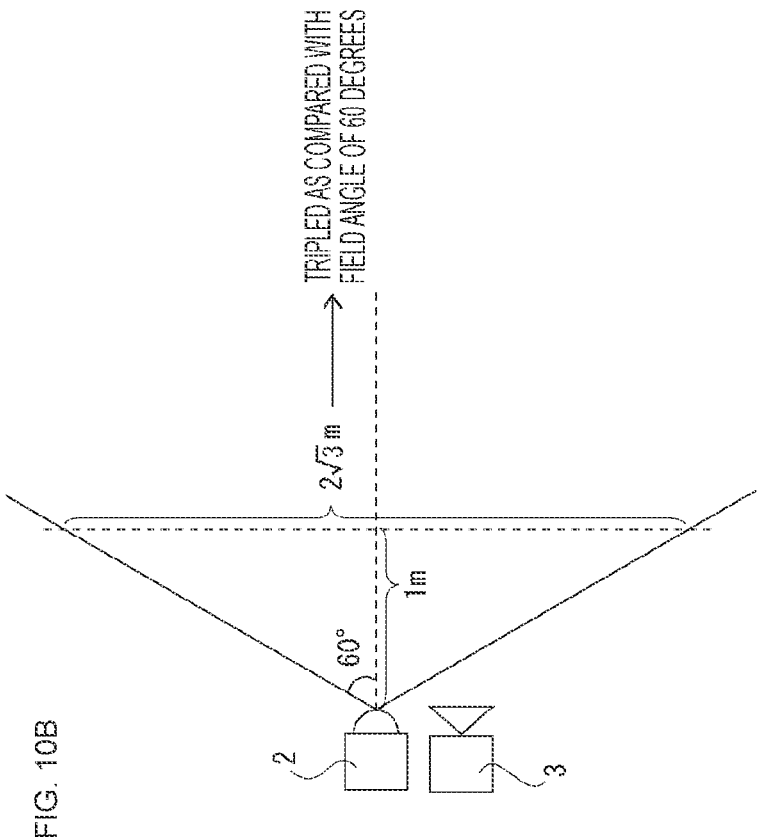
FIGS. 10A and 10B are explanatory diagrams as to relationship between widening of a view angle and a light projection amount.
Figure 10B:
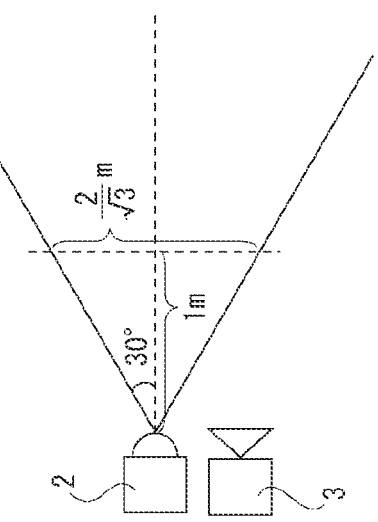

FIGS. 10A and 10B is an explanatory diagram as to this respect, and FIG. 10A shows an example of a light projection range required in a case of a standard field angle (for example, a field angle=60 degrees) and FIG. 10B shows an example of a light projection range required in a case of a wide view angle (for example, a field angle=120 degrees). Note that in FIGS. 10A and 10B, examples of ranges of light projection, required for the distance measurement of one meter (m) are shown.

As shown in FIGS. 10A and 10B, whereas the light projection range of the standard field angle in this case is "2/√3m", the light projection range of the wide view angle is "2√3m". In other words, in order to magnify the field angle two times, it is required to magnify the light projection range approximately three times and to largely increase the light projection amount. In addition, since in accordance with an increase in the field angle, influence of shading is easily exerted, also in order to obtain a sufficient reflected light amount in an image frame end, it is required to increase a light projection amount.

In view of these respects, employing the floodlight control method as the embodiment which allows the light projection amount required for the distance measurement to be decreased is advantageous in attaining the wide view angle of the distance measurable range Fv.

1-3. Processing Procedure

Subsequently, a specific processing procedure which should be executed in order to realize the floodlight control method as the above-described embodiment will be described with reference to flowcharts shown in FIGS. 11 and 12.

Figure 11:
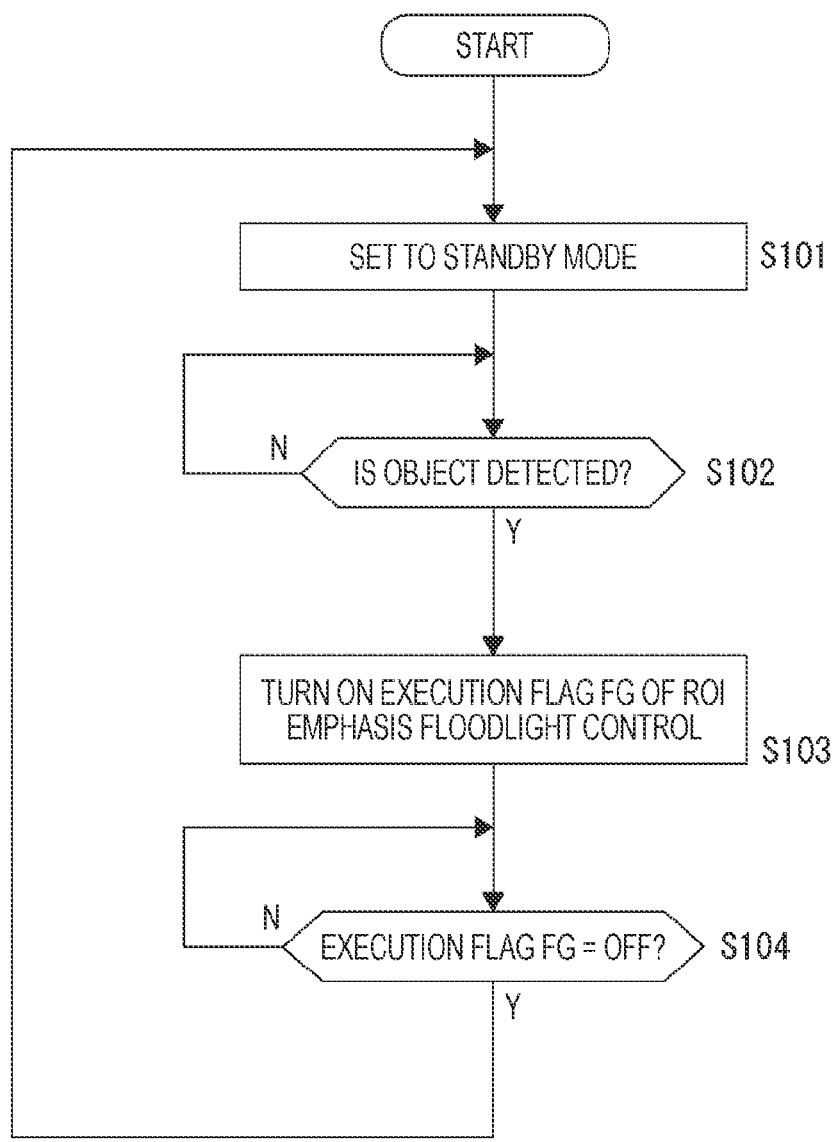
FIG. 11 is a flowchart showing processes for switching between a standby mode and an emphasis floodlight control in the first embodiment.

FIG. 11 shows processes for switching between the standby modes and the emphasis floodlight control.

Figure 12:
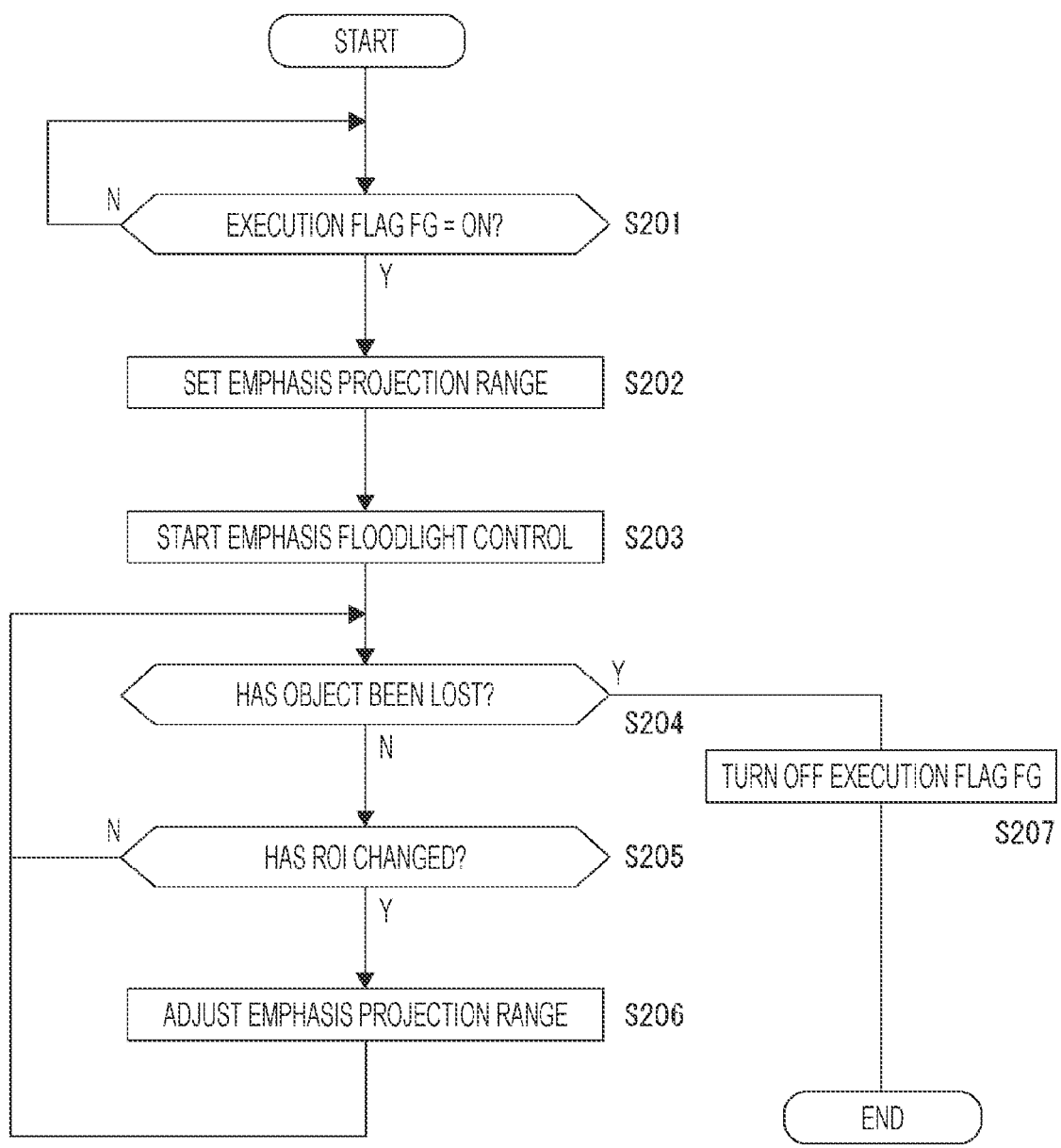
FIG. 12 is a flowchart showing processes related to the ROI emphasis floodlight control in the first embodiment.

In the present embodiment, the processes shown in FIGS. 11 and 12 are realized, for example, as software processes which the control part 8 having the microcomputer executes based on programs. Note that processes similar to those shown in FIGS. 11 and 12 can also be realized by hardware.

In FIG. 11, the control part 8 sets any of the standby modes in step S101. In other words, in the present embodiment, the control part 8 performs control to project the light in any projection mode of the standby modes (A), (B), and (C) described with reference to FIGS. 2A, 2B, 20, and 2D and to perform the distance measurement operation (object detection operation) in accordance therewith. At this time, as control on a side of the light projection, light emitting operation of the light emitting part 21 is controlled in such a way that the repetitive period of the light projection power ON time period (the continuous light projection time period of the light pulses) and the way of the light projection power is any of the periods and any of the ways of the light projection power described with reference to FIGS. 2B, 2C, and 2D.

In addition, as control on a side of the distance measurement, the frame rate of the ToF sensor 31 is controlled to adjust the repetitive period of the light projection power ON time period.

Here, in any of the standby modes, in a case where the distance measurement unnecessary region An is set by the unnecessary region setting part 7, the control part 8 controls the light projecting part 2 not to project the light to the distance measurement unnecessary region An. Specifically, in order not to project the light to the distance measurement unnecessary region An, the control part 8 in the present embodiment performs control in such a way that among the light emitting elements of the light emitting part 21, light emitting elements which are light sources of the light projected to blocks associated with the distance measurement unnecessary region An are set to be in a non-light emitting state.

In step S102 subsequent to step S101, the control part 8 stands by for the object detection. In other words, the control part 8 stands by until the object Sb is detected by the object detecting part 6.

Additionally, in a case where the object Sb is detected, the control part 8 proceeds to step S103 and executes a process in which an execution flag FG of the ROI emphasis floodlight control is turned ON. This execution flag FG is a flag referred to in processes in FIG. 12, and execution flag FG=ON indicates that the ROI emphasis floodlight control should be executed and execution flag FG=OFF indicates that the ROI emphasis floodlight control should be finished.

In step S104 subsequent to step S103, the control part 8 stands by until the execution flag FG is turned OFF. Here, the execution flag FG is turned OFF in accordance with an incidence in which the object Sb has been lost in the processes in FIG. 12 (refer to step S207).

Upon the execution flag FG=OFF, the control part 8 returns to step S101. With this arrangement, the ROI emphasis floodlight control is started in accordance with the detection of the object Sb, and thereafter, in a case where the object has been lost from within the distance measurable range Fv (that is, a case where a number of detection objects becomes zero), switching to any of the standby modes is conducted.

FIG. 12 shows processes of the ROI emphasis floodlight control.

First, in step S201, the control part 8 executes a process of standing-by until the execution flag FG=ON, and upon the execution flag FG=ON, the control part 8 proceeds to step S202 and sets the emphasis projection range. In other words, based on the ROI information acquired from the object detecting part 6, a range which corresponds to the ROI within the distance measurable range Fv (range by a block unit) is set as the emphasis projection range.

Additionally, in subsequent step S203, the control part 8 starts the emphasis floodlight control. In other words, the control part 8 executes processes to start the ROI emphasis floodlight control by employing any of the methods in the first example, the second example, and the third example described with reference to FIGS. 3 to 7.

Here, also in a case where any of the methods in the first example to the third example is employed, with the distance measurement unnecessary range An set, the light is not projected to the distance measurement unnecessary range An. Specifically, in any of the cases in the first example to the third example, light projection in a projection mode, which is different from the projection mode in which the light projection is performed for the emphasis projection range, is performed for a range other than the emphasis projection range within the distance measurable range Fv (that is, a non-detection region of the object Sb), and the light projection which should be performed for this region other than the emphasis projection range is targeted for a range excluding the distance measurement unnecessary range An.

Note that in the present embodiment, in order to differentiate the projection mode between the emphasis projection range (the detection region of the object Sb) and the range other than the emphasis projection range (the non-detection region of the object Sb), as to the light emitting elements of the light emitting part 21, which are the light sources of the light projected for the emphasis projection range, and the light emitting elements thereof, which are the light sources of the light projected for the range other than the emphasis projection range, the respective light emitting periods (in the present embodiment, the repetitive period of the period light emitting time periods of the light pulses) and respective levels of the light emitting power are controlled to be differentiated.

In addition, since upon the emphasis floodlight control, as to the ROI, the distance measurement is performed at the normal frame rate, a frame rate of the ToF sensor 31 is set to be the normal frame rate.

In step S204 subsequent to step S203, the control part 8 determines whether or not the object Sb has been lost. In other words, based on the object detection result obtained by the object detecting part 6, it is determined whether or not no object Sb is detected.

When the object Sb has not been lost, the control part 8 proceeds to step S205 and determines whether or not the ROI information has changed. The change of the ROI information referred to herein is mainly the change of the position of the ROI and the change in a number of the ROIs.

When the ROI information has not changed, the control part 8 returns to step S204. In other words, in the processes step S204 and S205, standing-by of any of the loss of the object Sb or the change in the ROI information is processed.

In step S205, in a case where the ROI information has changed, in step S206, the control part 8 processes adjustment of the emphasis projection range. Specifically, the processes to realize the follow-up of the light projection range as previously described with reference to FIG. 8, that is, proximity determination of the object Sb based on the end side position on the side of the traveling direction Dp in the above-described current emphasis projection range Ahn and addition of an emphasis projection range in accordance with a result of the proximity determination as well as deviation determination of the object Sb based on the end side position on the side of the traveling direction Dp in the opposite direction end block in the current emphasis projection range Ahn and exclusion of the block in accordance with a result of the deviation determination are performed. In addition, in step S205, in a case where a ROI is added in accordance with detection of a new object Sb, adding an emphasis projection range in accordance with the added ROI is also processed.

In accordance with the execution of the adjustment process in step S206, the control part 8 returns to step S204. With this arrangement, in a period until the object Sb has been lost, each time the ROI information changes, the adjustment process in step S206 is executed.

In addition, in step S204, in a case where the object Sb has been lost, the control part 8 proceeds to step S207 and sets the execution flag FG=OFF, and terminates a series of the processes shown in FIG. 12.

With this arrangement, in accordance with the detection of the object Sb, the ROI emphasis floodlight control is started, and thereafter, in a case where the object Sb has been lost, the mode is returned to any of the standby modes.

1-4. Detection of Dynamic Object

Note that although in the above description, the example in which the object detection is conducted by employing the background differencing technique is cited, in this case, a static object which does not move can be detected as an object.

Figure 13:
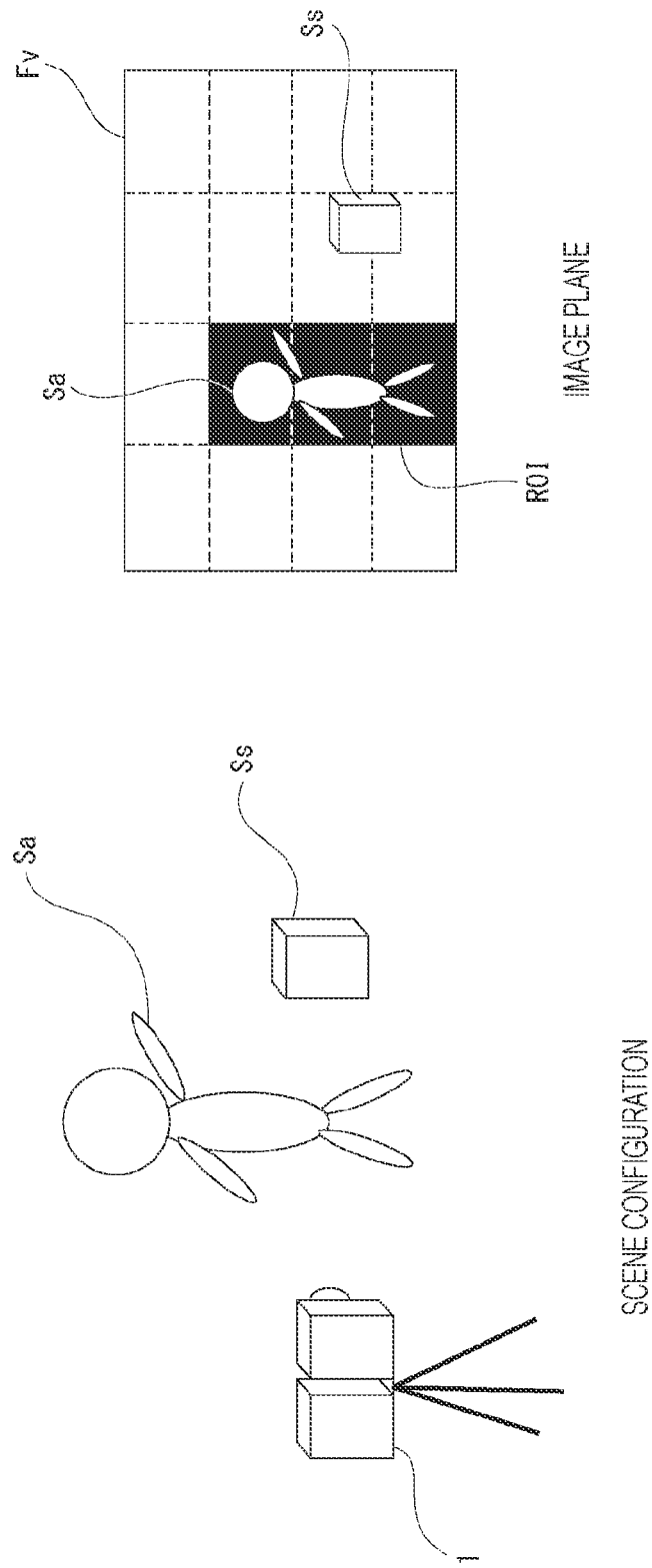
FIG. 13 an explanatory diagram as to a dynamic object detection in the embodiment.

In contrast to this, for example, as illustrated in FIG. 13, also a configuration in which only a dynamic object Sa (object which moves) is detected as an object targeted for the distance measurement can be made. In this case, the object detecting part 6 performs dynamic body detection as the object detection.

In this case, based on an object detection result obtained by the object detecting part 6, the control part 8 performs control in which the projection mode of the light projecting part 2 is differentiated between a region in which a dynamic object Sa is detected and a region in which the dynamic object Sa is not detected. With this arrangement, in order to handle a case where a target for the distance measurement is the dynamic object Sa, it is made possible to lower a light projection amount to the static object Ss.

Accordingly, power consumption required for the light projection is made further efficient.

2. SECOND EMBODIMENT

Subsequently, a second embodiment will be described.

In the second embodiment, as a ToF sensor, a sensor which is operable to switch between a light receiving mode for distance measurement and a light receiving mode for infrared light image acquisition is used.

Note that in the following description, the components and processes which have already been described are denoted by the same reference signs and step Nos. and the description therefor is omitted.

Figure 14:
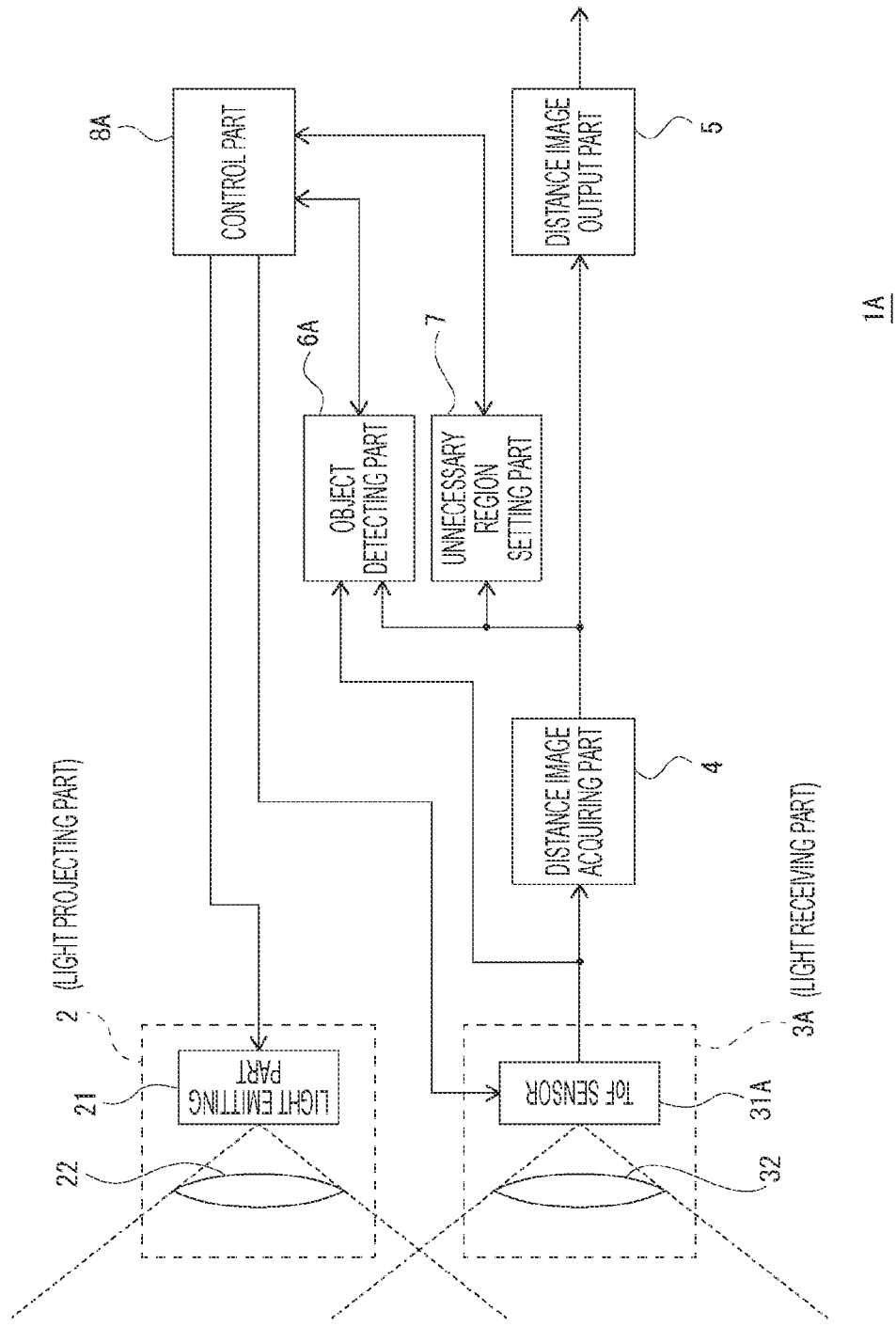
FIG. 14 is a diagram illustrating a configuration example of a floodlight control apparatus as a second embodiment.

FIG. 14 illustrates a configuration example of a floodlight control apparatus 1A as the second embodiment.

As differences thereof from the floodlight control apparatus 1 shown in FIG. 1, a light receiving part 3A is provided instead of the light receiving part 3, an object detecting part 6A is provided instead of the object detecting part 6, and a control part 8A is provided instead of the control part 8, respectively.

The light receiving part 3A is different from the light receiving part 3 in that a ToF sensor 31A is provided instead of the ToF sensor 31. The ToF sensor 31A is configured to be operable to switch between the light receiving mode for the distance measurement (hereinafter, a "distance measurement mode") and the light receiving mode for the infrared light image acquisition (hereinafter, an "IR imaging mode"). Specifically, in a case of the present embodiment in which an indirect ToF method is employed, the distance measurement mode is a mode in which intermittent signal electric charge accumulation at a period in synchronization with the above-described period of light pulses (in the present embodiment, a period of approximately several tens of MHz to several hundreds of MHz) is performed, and the IR imaging mode is mode in which the intermittent signal electric charge accumulation at such a short period is not performed and continuous signal electric charge accumulation (exposure) within a predetermined time period in one frame period is performed.

The object detecting part 6A can perform object detection based on a distance image as with the object detecting part 6 and can perform object detection based on an IR picked-up image (infrared light picked-up image) obtained by the ToF sensor 31A in the IR imaging mode.

The control part 8A sets a standby mode and performs ROI emphasis floodlight control in accordance with detection presence/absence of an object performed by the object detecting part 6A as with the control part 8 (each including control in which light projection is not performed to a distance measurement unnecessary region An).

However, the control part 8A performs mode switching control of the ToF sensor 31A and makes a projection mode in the standby mode different from that in the first embodiment.

Specifically, the control part 8A sets a mode of the ToF sensor 31A during the standby mode to be the IR imaging mode.

Here, in the IR imaging mode, based on the IR picked-up image, the object can be detected even without projecting light to a distance measurable range Fv. Therefore, in the second embodiment, during any of the standby modes, the light projection for the object detection is not performed. In other words, the control part 8A controls the light emitting part 21 not to project the light to within the distance measurable range Fv during any of the standby modes.

In addition, during any of the standby modes, the control part 8A causes the object detecting part 6A to detect an object based on the IR picked-up image obtained by the ToF sensor 31A which is set in the IR imaging mode.

As a result of the object detection based on the IR picked-up image during any of the standby modes, in a case where the object is detected, the control part 8A performs the ROI emphasis floodlight control as with the control part 8.

Hereinafter, a specific processing procedure executed by the control part 8A will be described.

First, the control part 8A executes processes similar to the processes shown in FIG. 11. However, as to the process of setting the standby mode in step S101, instead of the process of causing a light projecting part 2 to perform the light projection in any of the projection modes of the standby modes (A), (B), and (C) described with reference to FIGS. 2A, 2B, 2C, and 2D, a process of controlling all light emitting elements of a light emitting part 21 to be set in a non-light emitting state is performed. In addition, together therewith, a process of switching the ToF sensor 31A to the IR imaging mode and a process of instructing the object detecting part 6A to execute the object detection based on the IR picked-up image obtained by the ToF sensor 31A are performed.

Figure 15:
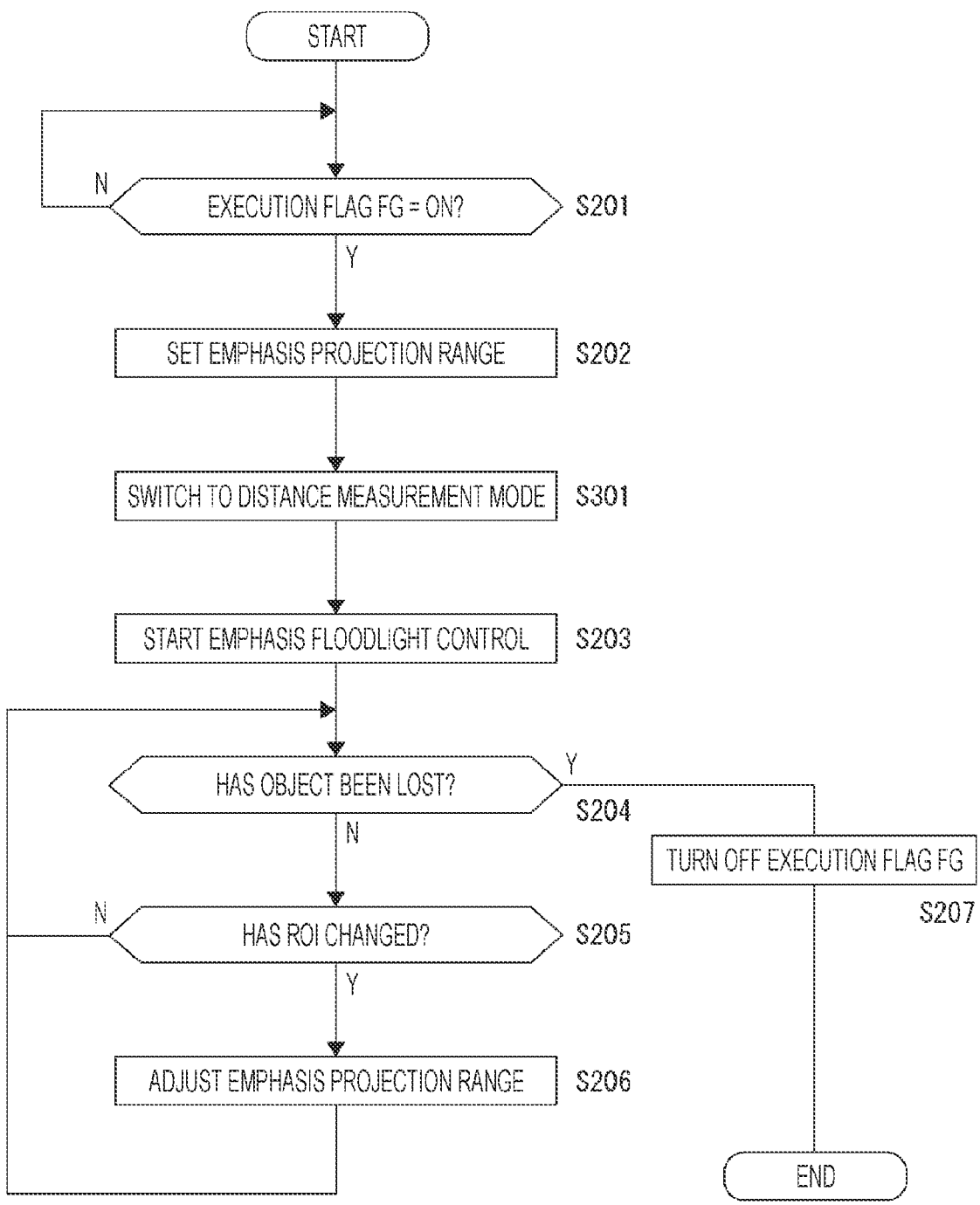
FIG. 15 is a flowchart showing processes related to a ROI emphasis floodlight control in the second embodiment.

Additionally, the control part 8A executes processes shown in FIG. 15 instead of the processes shown in FIG. 12.

A difference from the processes shown in FIG. 12 is that a process in step S301, that is, a process of switching the ToF sensor 31A to the distance measurement mode is inserted between the processes in step S202 and S203. By executing this process in step S301, the control part 8A causes the object detecting part 6A to execute the object detection based on a distance image obtained by the distance image acquiring part 4.

Note that the process in step S301 can also be executed between the processes in step S201 and S202.

Since a process of starting emphasis floodlight control in step S203 and subsequent processes are similar to those in the first embodiment, overlapping description is avoided.

As in the second embodiment, by providing the ToF sensor 31A which is operable to switch between the distance measurement mode and the IR imaging mode and causing the ToF sensor 31A to operate in the IR imaging mode during the standby mode (that is, in the object non-detection state), the light projection comes to be unnecessary for the object detection in the object non-detection state. In addition, separately providing an imaging part for the object detection is not needed to enable the object detection in a state in which no light is projected (refer to the later-described third embodiment).

Accordingly, while a number of system components and a system cost to enable the object detection in the object non-detection state are reduced, low power consumption can be devised by performing no light projection in the object non-detection state.

3. THIRD EMBODIMENT

Figure 16:
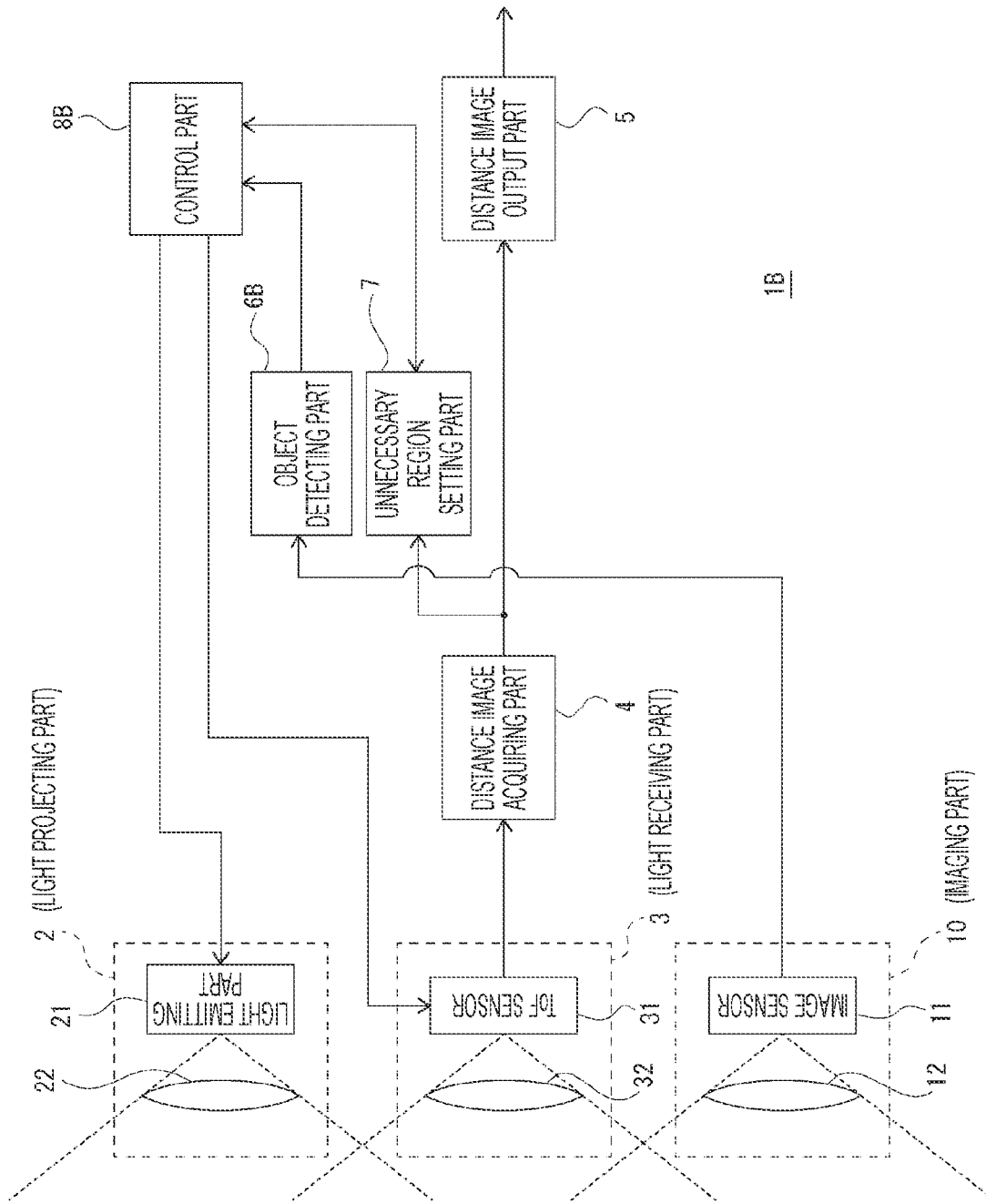
FIG. 16 is a diagram illustrating a configuration example of a floodlight control apparatus as a third embodiment.

FIG. 16 illustrates a configuration example of a floodlight control apparatus 1B as a third embodiment.

In the third embodiment, an imaging part 10 for object detection is provided separately from the light receiving part 3 for distance measurement.

The floodlight control apparatus 1B is different from the floodlight control apparatus 1 in that the imaging part 10 is provided, an object detecting part 6B is provided instead of the object detecting part 6, and a control part 8B is provided instead of the control part 8.

The imaging part 10 has an image sensor 11 constituted of, for example, a charged-coupled device (CCD) image sensor, a complementary metal-oxide-semiconductor (CMOS) sensor, or the like and an imaging optical system 12. The imaging optical system 12 collects reflected light from an object which is targeted for imaging and guides the reflected light to an imaging surface of the image sensor 11. The image sensor 11 receives the reflected light from the object, which is guided by the imaging optical system 12, performs photoelectric conversion, and obtains a picked-up image. In the present embodiment, as the image sensor 11, an image sensor which is sensitive to visible light is used.

An imaging field of view of the imaging part 10 is set to be a range which covers a distance measurable range Fv.

The object detecting part 6B is configured to be operable to perform object detection based on the picked-up image obtained by the imaging part 10.

The control part 8B performs control to differentiate a light projection amount provided by a light projecting part 2 in accordance with detection presence/absence of an object performed by the object detecting part 6B. In addition, in a case where the object detecting part 6B detects the object, the control part 8B performs control to differentiate a projection mode of the light projecting part 2 between an object detection region and a non-detection region.

Here, as in the floodlight control apparatus 1B, by providing the imaging part 10 for the object detection separately from the light receiving part 3 for the distance measurement, it is not required for the light projecting part 2 to perform light projection in order to enable the object detection during a standby mode and it is not required for the light projecting part 2 to perform the light projection in order to detect a new object in an object detection state. Therefore, the control part 8B performs control as described below.

Specifically, the control part 8B controls a light emitting part 21 not to project light to within a distance measurable range Fv during the standby mode, that is, in a state in which the object detecting part 6B does not detect any object, as with the control part 8A in the second embodiment. In other words, as to the processes shown in FIG. 11, the control part 8B performs processes similar to the processes performed by the control part 8A.

Figure 17:
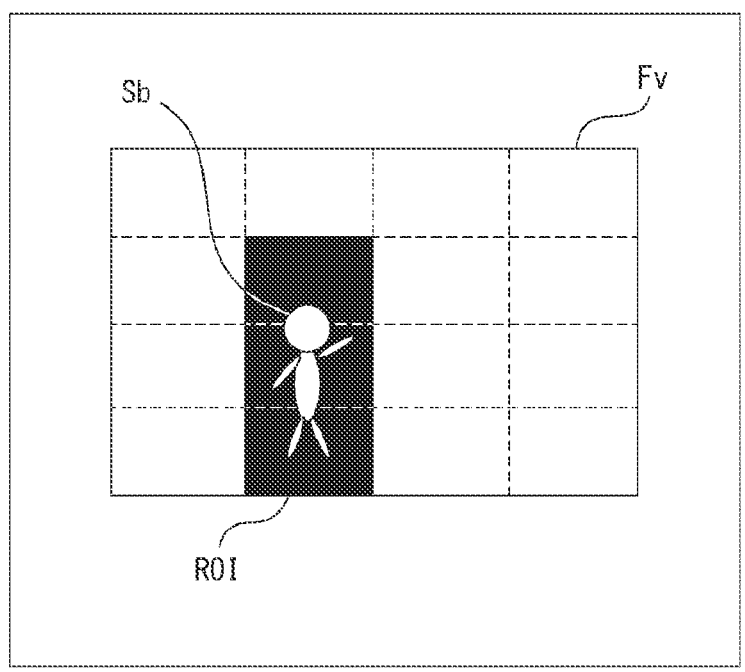
FIG. 17 is an explanatory diagram as to a ROI emphasis floodlight control in the third embodiment.

In addition, in response to the object detection performed by the object detecting part 6B, the control part 8B performs control to project light for a ROI as a target in a normal mode but not to project the light for a region other than the ROI as illustrated in the first example to the third example. In other words, as illustrated in FIG. 17, in an object detection state in this case, although the light projection targeted for the ROI in the normal mode is performed, the light projection is not performed for the region other than the ROI.

At this time, based on ROI information obtained from the object detecting part 6B, the control part 8B performs a process of adjusting an emphasis projection range, as with the control part 8 and the control part 8A. Specifically, the control part 8B performs processes similar to those shown in FIG. 12, and in this case, pieces of information referred to in emphasis projection range setting (S202), object lost determination (S204), and ROI information change determination (S205) are pieces of information obtained as a result of the object detection performed by the object detecting part 6B based on the picked-up image obtained by the imaging part 10.

Note that as is understood from the above description, in emphasis floodlight control started in a process in step S203, the light projecting part 2 (light emitting part 21) is controlled to project the light targeted for the emphasis projection range in the normal mode and not to project the light for a range other than the emphasis projection range.

Note that since in the floodlight control apparatus 1B, the light projection is not performed by the light projecting part 2 during the standby mode and the light projection is not performed thereby for the range other than the emphasis projection range also during the emphasis floodlight control, it is not required to perform the floodlight control in consideration of a distance measurement unnecessary region An. Therefore, the floodlight control apparatus 1B can also be configured not to be provided with an unnecessary region setting part 7.

In addition, in the floodlight control apparatus 1B, as the image sensor 11, an RGB image sensor which can acquire a picked-up image of a color image can be used. Alternately, an image sensor having an array other than a Bayer array, such as an RGB-IR sensor, can also be used. In addition, the image sensor 11 is not limited to the image sensor which can acquire the picked-up image of the color image, and as the image sensor 11, an image sensor which acquires a picked-up image of a monochrome image may be used.

Note that it is not required for the imaging part 10 to be provided in the floodlight control apparatus 1B, and the imaging part 10 may be provided externally to the floodlight control apparatus 1B.

4. FOURTH EMBODIMENT

A fourth embodiment relates to application examples of a floodlight control apparatus.

Figure 18:
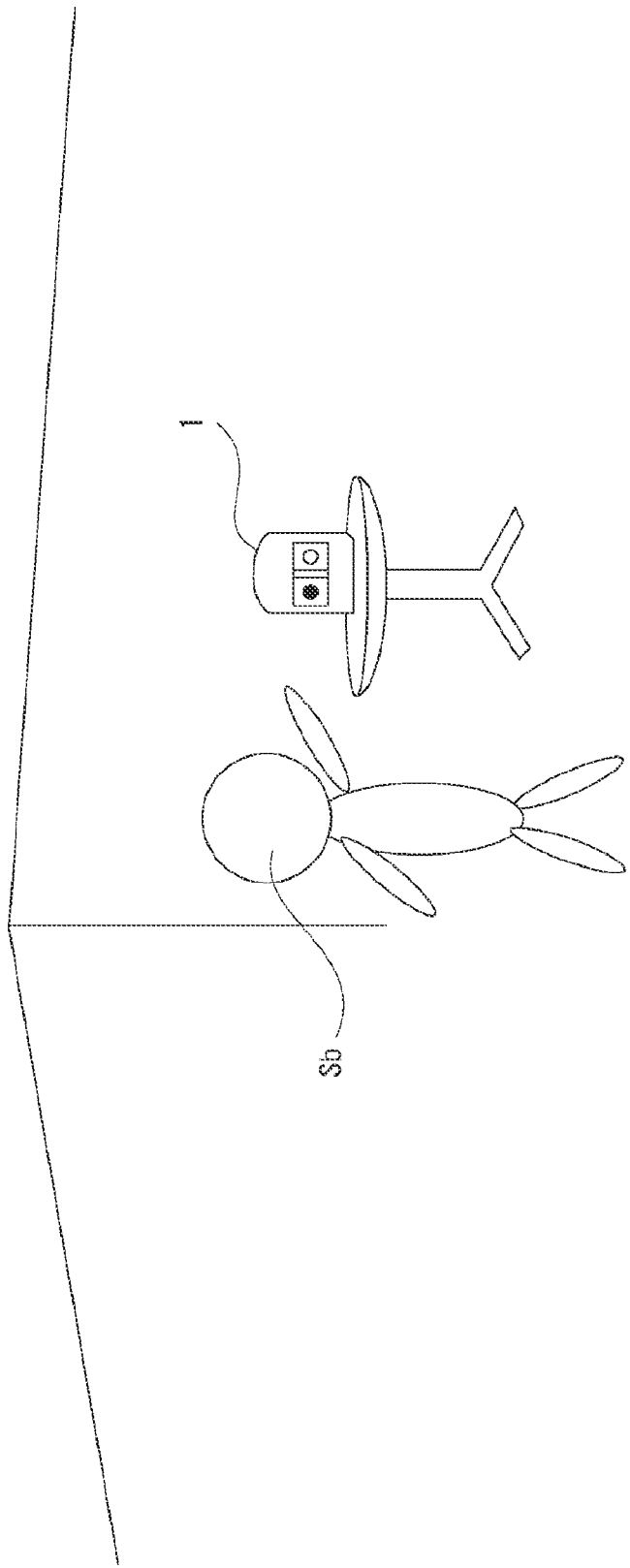
FIG. 18 is an explanatory diagram as to a first application example of the floodlight control apparatus in the embodiment.

FIG. 18 is an explanatory diagram as to a first application example.

In the first application example, the floodlight control apparatus 1 is applied to a household Internet of Things (IoT) device such as a smart speaker. In this case, a distance image obtained by a distance image acquiring part 4 is used for recognition (identification) and gesture recognition of a user. In addition, the distance image can also be used for recording of an activity log of a user or the like.

For example, based on a result of the gesture recognition, operation of the device can be switched. In addition, based on detection presence/absence of a user, for example, when a user has left a room in which the device is located, the device can be shifted to a sleep state, and when a user has entered the room, the sleep state can also be released.

Since a distance image in an object detection state is an image targeted for an object detection region by floodlight control as each of the above-described embodiments, a data amount is smaller than that in a case where a whole of a distance measurable range Fv is processed, thereby contributing to a reduction in a processing load.

In addition, since by employing the floodlight control as each of the embodiments, a wide view angle can be devised and distance measurement in a wide range can be thereby performed, one household IoT device can cover the whole room.

Furthermore, as compared with a case where distance measurement is conducted by a stereo camera, the ToF does not need a baseline length, thereby contributing to miniaturization of the household IoT device.

Figure 19:
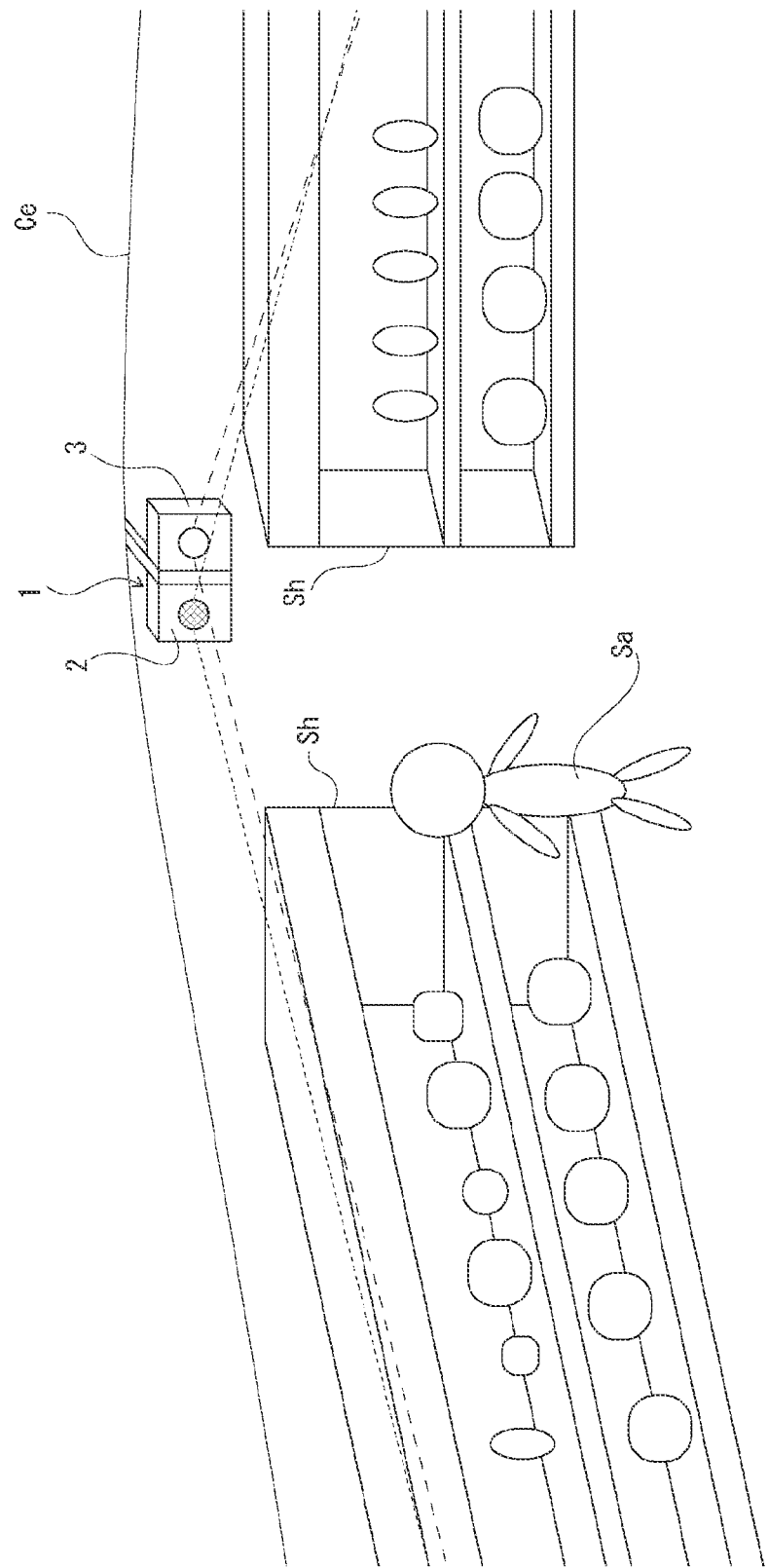
FIG. 19 is an explanatory diagram as to a second application example of the floodlight control apparatus in the embodiment.

FIG. 19 is an explanatory diagram as to a second application example.

The second application example is an example in which a floodlight control apparatus 1 is used for activity analysis of customers in a commercial facility such as a store.

As shown in FIG. 19, application to a retail store in which showcases Sh in which commodities are displayed are arranged is considered.

In this case, the floodlight control apparatus 1 sets showcases Sh and an object Sa (dynamic object) as a customer within a distance measurable range Fv, in predetermined directions, for example, under a ceiling Ce of a store interior. For example, it is considered that the showcases Sh and the object Sa are set in such a way as to face in an obliquely downward direction or a directly downward direction.

In order to attain low power consumption, it is desirable that an object detecting part 6 in this case detects a dynamic object by dynamic body detection.

In this case, a distance image obtained by a distance image acquiring part 4 of the floodlight control apparatus 1 can be used for activity analysis related to purchase made by the object Sa. For example, based on a movement history of the object Sa between sales floors, a traffic line can be detected. In addition, for example, based on the distance image, bone estimation of a person as the object Sa (for example, estimation of human body portions such as a head, a trunk, arms, and legs) can be performed, and based on a result thereof, a stage number of the showcase Sh and a position thereof, where a commodity touched by the object Sa is placed, and the like can also be analyzed.

Also in this case, attaining a wide view angle by the floodlight control as each of the embodiments can be devised, thereby allowing one floodlight control apparatus 1 to cover a wide range inside the store.

Here, in order to attain the wide view angle, a configuration in which a plurality of light projecting parts 2 is provided can also be adopted.

Figure 20:
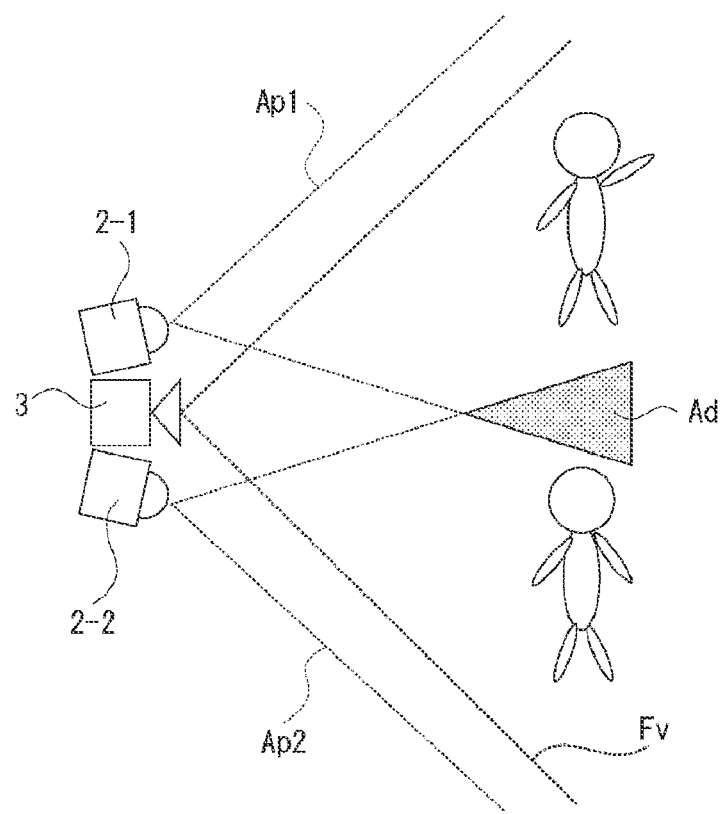
FIG. 20 is an explanatory diagram as to a configuration in which a plurality of light projecting parts is provided.

For example, as shown in FIG. 20, two light projecting parts 2, which are a light projecting part 2-1 and a light projecting part 2-2, are provided. These light projecting parts 2 project light to regions within the distance measurable range Fv, which are different from each other. A light receiving part 3 in this case is configured to be operable to receive reflected light of the light projected by each of these light projecting parts 2.

In FIG. 20, relationship of the distance measurable range Fv, a light projection range Ap1 by the light projecting part 2-1, and a light projection range Ap2 by the light projecting part 2-2 is illustrated, and as shown as an overlapping range Ad in FIG. 20, there may be a case where the light projection range Ap1 and the light projection range Ap2 overlap each other. In this case, upon distance measurement, the light is not concurrently projected from the plurality of light projecting parts 2 to the overlapping range Ad. For example, by controlling light emitting elements of any one of the light projecting part 2-1 and the light projecting part 2-2, which are light sources of the light projected to the overlapping range Ad, to be in a non-light emitting state, the concurrent light projection to the overlapping range Ad is not performed. Since if the plurality of light projecting parts 2 concurrently projects the light to the same region, multipath propagation occurs and a distance measurement accuracy is thereby reduced, this is prevented.

Figure 21:
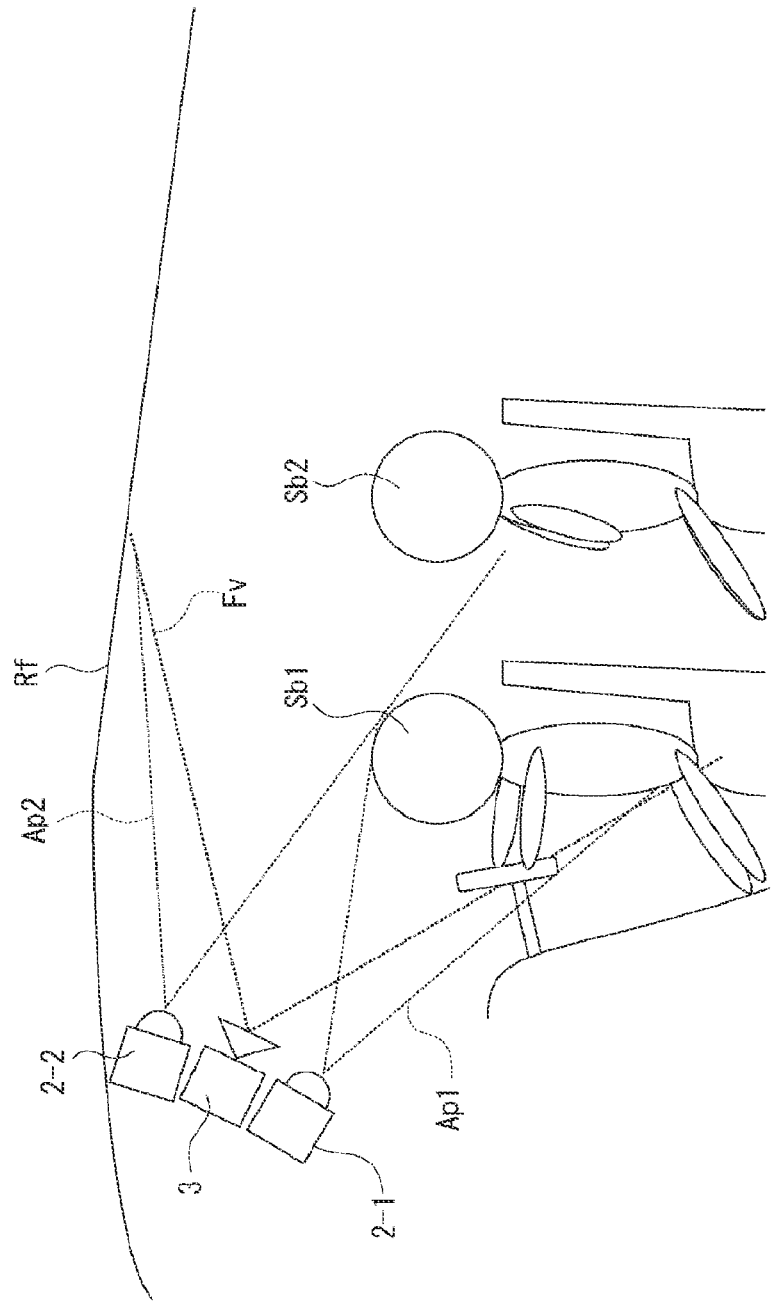
FIG. 21 is an explanatory diagram as to a third application example of the floodlight control apparatus in the embodiment.

FIG. 21 is an explanatory diagram as to a third application example.

The third application example is an example to which the configuration shown in FIG. 20 is applied.

In the present application example, a floodlight control apparatus 1 which includes a light projecting part 2-1 and a light projecting part 2-2 is located, for example, inside a vehicle interior of an automobile, and distance measurement targeted for objects Sb as occupants is performed. In this case, the light projecting part 2-1, the light projecting part 2-2, and a light receiving part 3 are located on a high place of a front end portion of the vehicle interior such as the vicinity of a roof Rf on a front end side of the vehicle interior, and a front seat and a rear seat as a driver's seat and a passenger's seat are included within a distance measurable range Fv.

In this case, the light projecting part 2-1 as a light projecting part 2 for a short distance is configured to perform light projection to a light projection range Ap1 of a range which includes the front seat within the distance measurable range Fv, and the light projecting part 2-2 as a light projecting part 2 for a long distance is configured to perform light projection to a light projection range Ap2 of a range which includes the rear seat within the distance measurable range Fv. With this arrangement, distance measurement can be performed as to an object Sb1 (that is, an object Sb on a short distance side) as an occupant on the front seat based on the light projected by the light projecting part 2-1, and distance measurement can be performed as to an object Sb2 (that is, an object Sb on a long distance side) as an occupant on the rear seat based on the light projected by the light projecting part 2-2.

Note that although in each of the above-described first application example to the third application example, the application example using the floodlight control apparatus 1 is described, in each of these application examples, a configuration in which each of the floodlight control apparatus 1A and the floodlight control apparatus 1B is similarly used can be adopted.

5. MODIFIED EXAMPLES OF EACH EMBODIMENT

Although in the above description, the example in which the light projecting part 2 has the plurality of the VCSEL type light emitting elements is described, the light sources which the light projecting part 2 has is not limited to the VCSEL, and the number of the light sources which the light projecting part 2 has is not limited to the plural number.

For example, as the configuration of the light projecting part 2, a configuration which handles an optical scan method using laser light sources and micro electro mechanical systems (MEMS) can be adopted, and in such a case, the number of the light sources can also be singular. Note that in a case where the optical scan method is adopted, by not performing light projection in a scan position other than an object detection region or lowering the light projection power in the scan position other than the object detection region or making the repetitive period of the light projection power ON time period long, a light projection amount in a non-detection region of an object can be made smaller than that in the detection region of the object.

In addition, as the configuration of the light projecting part 2, a configuration in which a diffractive optical element (DOE) is used as a light projecting optical system 22 can also be adopted.

In addition, although in the above description, the example in which the distance measurement unnecessary region An is set based on the light receiving signal of the ToF sensor 31 is cited, the distance measurement unnecessary region An can also be set based on operation input made by a user. For example, a predetermined display device is caused to display a distance image and a picked-up image obtained by an imaging part 10 and operation to designate the distance measurement unnecessary region An, conducted by a user, is received, that is, operation to designate a range which should be set as the distance measurement unnecessary region An within an image frame is received, and an unnecessary region setting part 7 sets the distance measurement unnecessary region An based on information of the range designated by the operation.

Note that in a case where the distance measurement unnecessary region An is set based on the operation input conducted by a user as described above, the distance measurement unnecessary region An is not limited to a region where the distance measurement is impossible, such as a remote region, and in view of a purpose of the distance measurement and the like, a region where the distance measurement is widely unnecessary, such as a region where performing the distance measurement is not required, can be set.

In addition, although in the above description, the example in which the floodlight control method according to the present technology is applied to the case where the distance measurement employing the indirect ToF method is performed is cited, the floodlight control method according to the present technology can also be suitably applied to a case where the distance measurement employing the direct ToF is performed or a case where the distance measurement employing a structured light (STL) method is performed.

6. CONCLUDING REMARKS OF EMBODIMENTS

As described above, each of the floodlight control apparatuses (floodlight control apparatuses 1, 1A, and 1B) as the embodiments includes: the light receiving part (each of the light receiving part 3 and 3A) which is provided with the plurality of light receiving elements which receives the reflected light of the light projected by the light projecting part (light projecting part 2); the object detecting part (each of the object detecting parts 6, 6A, and 6B) which performs the object detection targeted for the distance measurable range as the range where the light receiving part is operable to receive the reflected light; and the control part (each of the control parts 8, 8A, and 8B) which performs control of differentiating the light projection amount provided by the light projecting part in accordance with the detection presence/absence of the object performed by the object detecting part and in the case where the object detecting part detects the object, differentiating the projection mode of the light projecting part between the detection region and the non-detection region of the object.

As described above, by differentiating the light projection amount in accordance with the detection presence/absence of the object, when the object as the target for the distance measurement is not detected, it is made possible to decrease the light projection amount, thereby devising prevention of unnecessary power consumption. In addition, by differentiating the projection mode between the non-detection region and the detection region in the case where the object is detected, it is made possible to make the light projection amount (including also a light projection amount per unit time) in the non-detection region smaller than that in the detection region, thereby allowing power consumed while the distance measurement of the detected object is performed to be reduced.

Accordingly, as to the optical distance measurement system, the power consumption required for the light projection can be made efficient and low power consumption can be devised.

In addition, in the floodlight control apparatus as each of the embodiments, the control part performs the control in which the light projection frequency for the non-detection region is made lower than the light projection frequency for the detection region in the object detection state.

With this arrangement, it is made possible to reduce the power consumed in the object non-detection state and also the power consumed while the distance measurement of the detected object is performed. In addition, since it is made possible to perform the distance measurement based on the light receiving signal obtained by the light receiving part as to the non-detection region, an object which newly appears within the distance measurable range can be detected without separately providing an imaging part for the object detection.

Accordingly, low power consumption enabled by making the power consumption required for the light projection efficient can be realized while a reduction in a number of system components and a reduction in a system cost to enable the detection of the newly appearing object within the distance measurable range are devised.

Furthermore, in the floodlight control apparatus as each of the embodiments, the control part performs the control in which in a state in which the object is detected, the light projection power for the non-detection region is made lower than the light projection power for the detection region.

With this arrangement, it is made possible to reduce the power consumed in the object non-detection state and also the power consumed while the distance measurement of the detected object is performed. In addition, since the distance measurement can be performed based on the reflected light of the light having the low power and projected for the non-detection region, the detection of an object which newly appears within the distance measurable range can be performed without separately providing the imaging part for the object detection.

Accordingly, low power consumption enabled by making the power consumption required for the light projection efficient can be realized while a reduction in a number of system components and a reduction in a system cost to enable the detection of the newly appearing object within the distance measurable range are devised.

Furthermore, in the floodlight control apparatus as each of the embodiments, the control part (8B) controls the light projecting part so that the light is not projected to the non-detection region in the object detection state.

With this arrangement, the power consumed while the distance measurement of the detected object is performed can be minimized.

Accordingly, effect to reduce the consumed power can be enhanced.

In addition, in the floodlight control apparatus as each of the embodiments, in the object non-detection state, the control part controls the light projecting part to project the light in a light projection amount smaller than a light projection amount of the light projected for the detection region in the object detection state.

With this arrangement, in the object non-detection state, the reduction in the consumed power by lowering the light projection amount can be devised and based on the distance image obtained based on the reflected light of the projected light, the object detection can be performed. In other words, it is not required to separately provide the imaging part for the object detection to enable the object detection in the object non-detection state.

Accordingly, the low power consumption enabled by lowering the light projection amount in the object non-detection state can be devised while the reduction in the number of the system components and the reduction in the system cost to enable the object detection in the object non-detection state are devised.

Furthermore, in the floodlight control apparatus as each of the embodiments, the control part changes the range of the light projection performed by the light projecting part in accordance with the movement of the object.

With this arrangement, in a case where the object moves, it can be prevented that the light is not projected to a part of the object and the distance measurement is made impossible.

Accordingly, distance measurement performance can be enhanced.

Moreover, in the floodlight control apparatus as each of the embodiments, the control part differentiates the projection mode of the light projecting part between the detection region and the non-detection region of the dynamic object detected by the object detecting part.

With this arrangement, the light projection amount for a static object can be lowered with respect to that in a case where a target for the distance measurement is a dynamic object.

Accordingly, the power consumption required for the light projection can be made further efficient, and the reduction in the consumed power can be further devised.

In addition, in the floodlight control apparatus as each of the embodiments (floodlight control apparatus 1A), the light receiving part (light receiving part 3A) is configured to be operable to switch between the first light receiving mode which is the light receiving mode for the distance measurement and the second light receiving mode which is the light receiving mode for the infrared light image acquisition, and the control part (control part 8A) causes the light receiving part to operate in the second light receiving mode in the object non-detection state.

With this arrangement, the light projection is unnecessary to perform the object detection in the object non-detection state. In addition, it is not required to separately provide the imaging part for the object detection to enable the object detection in a state in which the light projection is not performed.

Accordingly, while a number of system components and a system cost to enable the object detection in the object non-detection state are reduced, low power consumption can be devised by performing no light projection in the object non-detection state.

Furthermore, the floodlight control apparatus as each of the embodiments includes the unnecessary region setting part (unnecessary region setting part 7) which sets the distance measurement unnecessary region within the distance measurable range, and the control part controls the light projecting part not to project the light for the distance measurement unnecessary region regardless of the detection presence/absence of the object performed by the object detecting part.

With this arrangement, the light is not projected for the region in which the distance measurement is unnecessary.

Accordingly, the power consumption required for the light projection can be made further efficient, and the reduction in the consumed power can be further devised.

Moreover, in the floodlight control apparatus as each of the embodiments, the unnecessary region setting part sets the distance measurement unnecessary region based on the light receiving signal obtained by the light receiving part.

By using the light receiving signal, the region whose distance measurement is estimated to be unnecessary such as a region where a physical object is present at a distance at which the light does not reach the physical object (that is, a distance substantially unmeasurable region) can be detected, and the distance measurement unnecessary region can be set, not by hand.

Accordingly, it is not required for a user to designate the distance measurement unnecessary region and a burden of the user can be reduced.

In addition, in the floodlight control apparatus as each of the embodiments, the light receiving part is configured to be operable to receive the reflected light of the light which the plurality of light projecting parts projects for the respective different regions within the distance measurable range.

By using the plurality of light projecting parts, it is made possible to cause the individual light projecting parts to share the whole wide-angle distance measurable range as the light projection range.

Accordingly, light projection power required for the distance measurement targeted for the distance measurable range having the same area can be made lower than that required in a case where only one light projecting part is used, thereby allowing low power consumption to be devised. In other words, by an extent of the reduction in the consumed power, the light projection range can be widened, thereby allowing a wide view angle of the distance measurable range to be devised.

In addition, the floodlight control method as the embodiment includes: the object detection procedure in which performed is the object detection targeted within the distance measurable range which is the range where the light receiving part being provided with the plurality of light receiving elements which receives the reflected light of the light being projected by the light projecting part is operable to receive the reflected light; and the control procedure in which performed is control of differentiating the light projection amount being provided by the light projecting part in accordance with the detection presence/absence of the object being performed in the object detection procedure and in the case where the object is detected in the object detection procedure, differentiating the projection mode of the light projecting part between the detection region and the non-detection region of the object.

Also by employing the floodlight control method as the above-described embodiment, action and effect similar to those obtained by the floodlight control apparatus as each of the above-described embodiments can be obtained.

Note that the effect described in this specification is illustrative only and the effect is not limited thereto and there may also be another effect.

7. THE PRESENT TECHNOLOGY

Note that the present technology can also adopt the below-described configuration.

(1)

A floodlight control apparatus including:

a light receiving part which is provided with a plurality of light receiving elements which receives reflected light of light being projected by a light projecting part;

an object detecting part which performs object detection being targeted within a distance measurable range which is a range where the light receiving part is operable to receive the reflected light; and a control part which performs control of differentiating a light projection amount being provided by the light projecting part in accordance with detection presence/absence of an object being performed by the object detecting part and in a case where the object detecting part detects the object, differentiating a projection mode of the light projecting part between a detection region and a non-detection region of the object.

(2)

The floodlight control apparatus according to the above (1), in which the control part performs control in which in an object detection state, a light projection frequency for the non-detection region is made lower than a light projection frequency for the detection region.

(3)

The floodlight control apparatus according to the above (1) or (2), in which the control part performs control in which in the object detection state, light projection power for the non-detection region is made lower than light projection power for the detection region.

(4)

The floodlight control apparatus according to any of the above (1) to (3), in which in the object detection state, the control part controls the light projecting part not to project the light for the non-detection region.

(5)

The floodlight control apparatus according to any of the above (1) to (3), in which in an object non-detection state, the control part controls the light projecting part to project the light in a light projection amount smaller than a light projection amount of the light being projected for the detection region in the object detection state.

(6)

The floodlight control apparatus according to any of the above (1) to (5), in which the control part changes a range of light projection being performed by the light projecting part in accordance with movement of the object.

(7)

The floodlight control apparatus according to any of the above (1) to (6), in which the control part differentiates a projection mode of the light projecting part between a detection region and a non-detection region of a dynamic object being detected by the object detecting part.

(8)

The floodlight control apparatus according to any of the above (1) to (4), (6), and (7), in which the light receiving part is configured to be operable to switch between a first light receiving mode which is a light receiving mode for distance measurement and a second light receiving mode which is a light receiving mode for infrared light image acquisition, and in the object non-detection state, the control part causes the light receiving part to operate in the second light receiving mode.

(9)

The floodlight control apparatus according to any of the above (1) to (8), further including an unnecessary region setting part which sets a distance measurement unnecessary region within the distance measurable range, in which regardless of the detection presence/absence of the object being performed by the object detecting part, the control part controls the light projecting part not to project the light for the distance measurement unnecessary region.

(10)

The floodlight control apparatus according to the above (9), in which the unnecessary region setting part sets the distance measurement unnecessary region based on a light receiving signal obtained by the light receiving part.

(11)

The floodlight control apparatus according to any of the above (1) to (10), in which the light receiving part is configured to be operable to receive reflected light of light which a plurality of the light projecting parts projects for respective different regions within the distance measurable range.

REFERENCE SIGNS LIST 1, 1A, 1B Floodlight control apparatus
2 Light projecting part
21 Light emitting part
22 Light projecting optical system
3, 3A Light receiving part
31, 31A ToF sensor
32 Light receiving optical system
4 Distance image acquiring part
6, 6A, 6B Object detecting part
7 Unnecessary region setting part
8, 8A, 8B Control part
10 Imaging part
11 Image sensor
12 Imaging optical system
Sb object
Fv Distance measurable range
Dp Traveling direction
An Distance measurement unnecessary region
Ahn Current emphasis projection range
Ap1, Ap2 Light projection range
Ad Overlapping range

The invention claimed is:

1. A floodlight control apparatus, comprising:
   a light receiving part that includes a plurality of light receiving elements configured to receive reflected light of light projected by a light projector;
   an object detecting part configured to detect, based on the reflected light, one of a presence or an absence of an object within a distance measurable range which is a range where the light receiving part is operable to receive the reflected light; and
   a control part configured to:
   control, based on the detection of the absence of the object, the light projector to project the light at a first power;
   control, based on the detection of the presence of the object, the light projector to project the light at the first power for a non-detection region of the object; and
   control, based on the detection of the presence of the object, the light projector to project the light at a second power higher than the first power for a detection region of the object.

2. The floodlight control apparatus according to claim 1, wherein
   the control part is further configured to control, based on the detection of the presence of the object, the light projector to project the light at a first light projection frequency for the non-detection region and project the light at a second light projection frequency for the detection region, and
   the first light projection frequency for the non-detection region is lower than the second light projection frequency for the detection region.

3. The floodlight control apparatus according to claim 1, wherein the control part is further configured to control, based on the detection of the presence of the object, the light projector not to project the light for the non-detection region.

4. The floodlight control apparatus according to claim 1, wherein the control part is further configured to control, based on a movement of the object, the light projector to change a range of the light.

5. The floodlight control apparatus according to claim 1, wherein
   the object detecting part is further configured to detect a dynamic object, and
   the control part is further configured to differentiate a projection mode of the light projector between a detection region of the detected dynamic object and a non-detection region of the detected dynamic object.

6. The floodlight control apparatus according to claim 1, wherein
   the light receiving part is further configured to be operable to switch between a first light receiving mode which is a light receiving mode for distance measurement and a second light receiving mode which is a light receiving mode for infrared light image acquisition, and
   the control part is further configured to control, based on the detection of the absence of the object, the light receiving part to operate in the second light receiving mode.

7. The floodlight control apparatus according to claim 1, further comprising an unnecessary region setting part configured to set a distance measurement unnecessary region within the distance measurable range,
   wherein regardless of the detection of the one of the presence or the absence of the object by the object detecting part, the control part is further configured to control the light projector not to project the light for the distance measurement unnecessary region.

8. The floodlight control apparatus according to claim 7, wherein the light receiving part is further configured to obtain a light receiving signal, and the unnecessary region setting part is further configured to set the distance measurement unnecessary region based on the obtained light receiving signal.

9. The floodlight control apparatus according to claim 1, wherein the light receiving part is further configured to receive reflected light of light which a plurality of light projectors projects for respective different regions within the distance measurable range, and the plurality of light projectors includes the light projector.

10. A floodlight control method, comprising:

receiving, by a plurality of light receiving elements of a light receiving part, reflected light of light projected by a light projector;

detecting, based on the reflected light, one of a presence or an absence of an object within a distance measurable range which is a range where the light receiving part is operable to receive the reflected light;

controlling, based on the detection of the absence of the object, the light projector to project the light at a first power;

controlling, based on the detection of the presence of the object, the light projector to project the light at the first power for a non-detection region of the object; and controlling, based on the detection of the presence of the object, the light projector to project the light at a second power higher than the first power for a detection region of the object.

* * * * *